(12) United States Patent
Zuchoski et al.

(10) Patent No.: US 10,864,954 B2
(45) Date of Patent: Dec. 15, 2020

(54) TRACK SYSTEM FOR TRACTION OF A VEHICLE

(71) Applicant: CAMSO INC., Magog (CA)

(72) Inventors: Jeremie Zuchoski, Sherbrooke (CA); Bernard Jean, Sain-Mathieu-du-Parc (CA)

(73) Assignee: Camso Inc., Magog (CA)

( * ) Notice: Subject to any disclaimer, the term of this patent is extended or adjusted under 35 U.S.C. 154(b) by 424 days.

(21) Appl. No.: 15/342,714

(22) Filed: Nov. 3, 2016

(65) Prior Publication Data

US 2017/0120970 A1    May 4, 2017

Related U.S. Application Data

(60) Provisional application No. 62/250,246, filed on Nov. 3, 2015.

(51) Int. Cl.
| | |
|---|---|
| *B62D 55/116* | (2006.01) |
| *B62D 55/08* | (2006.01) |
| *B62D 55/108* | (2006.01) |
| *B62D 55/24* | (2006.01) |
| *A01D 41/02* | (2006.01) |
| *B62D 55/065* | (2006.01) |
| *B62M 27/02* | (2006.01) |

(52) U.S. Cl.
CPC .......... *B62D 55/116* (2013.01); *B62D 55/08* (2013.01); *B62D 55/108* (2013.01);
(Continued)

(58) Field of Classification Search
CPC .... B62D 55/116; B62D 55/08; B62D 55/244; B62D 55/108; B62D 55/065;
(Continued)

(56) References Cited

U.S. PATENT DOCUMENTS

| | | | | |
|---|---|---|---|---|
| 3,972,569 A | * | 8/1976 | Bricknell | B62D 55/30 305/144 |
| 6,615,939 B1 | * | 9/2003 | Karales | B62D 55/04 180/9.21 |

(Continued)

*Primary Examiner* — S. Joseph Morano
*Assistant Examiner* — Jean W Charleston
(74) *Attorney, Agent, or Firm* — Smart & Biggar LLP

(57) ABSTRACT

A track system for traction of a vehicle, such as an all-terrain vehicle (ATV), an agricultural vehicle, etc. The track system comprises a track and a track-engaging assembly for driving and guiding the track around the track-engaging assembly. The track system may be configured to facilitate adjustment of certain aspects of its operation, including, for example, how it is positioned and/or can move relative to a frame of the vehicle, based on one or more factors, such as, for instance, a user's preferences (e.g., riding style, desire to "feel" the ground, etc.), an environment of the track system (e.g., a profile of the ground, such as a slope or steepness or a levelness of the ground; a compliance of the ground, such as a softness or hardness of the ground, etc.), a state of the track system (e.g., a speed and/or a direction of motion of the track, etc.), a state of the vehicle (e.g., a speed and/or direction of the vehicle, etc.), and/or any other suitable factor. For instance, the track system may comprise a control mechanism configured to adjust an anti-rotation device that is configured to restrict movement of the track system relative to the frame of the vehicle. The control mechanism may be configured to adjust the anti-rotation device in response to a command, which may be input via a user interface or automatically generated by a controller.

48 Claims, 32 Drawing Sheets

(52) U.S. Cl.
CPC ............ *B62D 55/244* (2013.01); *A01D 41/02* (2013.01); *B62D 55/065* (2013.01); *B62M 27/02* (2013.01); *B62M 2027/027* (2013.01)

(58) Field of Classification Search
CPC .............. B62D 55/104; B62D 55/1083; B62D 55/1086; B62D 55/112; B62D 55/1125; A01D 41/02; B62M 27/02
USPC ......... 305/15, 116, 124, 127, 128, 130, 132, 305/135; 180/6.7, 9.21, 9.52, 9.1, 9.5
See application file for complete search history.

(56) References Cited

U.S. PATENT DOCUMENTS

| | | | | |
|---|---|---|---|---|
| 8,714,296 B2* | 5/2014 | Sano | .................... | B60Q 1/1461 180/336 |
| 2001/0027887 A1* | 10/2001 | Lillbacka | ................ | B60G 15/12 180/182 |
| 2006/0131156 A1* | 6/2006 | Voelckers | ............. | G06F 3/0234 200/512 |
| 2009/0194345 A1* | 8/2009 | Bessette | ................ | B62D 55/10 180/9.21 |
| 2010/0174456 A1* | 7/2010 | Beaudoin | ............. | B60W 10/06 701/51 |
| 2011/0315459 A1* | 12/2011 | Zuchoski | ............ | B60W 50/082 180/9.21 |
| 2012/0104840 A1* | 5/2012 | Zuchoski | ............... | B62D 55/10 305/100 |
| 2012/0242142 A1* | 9/2012 | Kautsch | ................ | B62D 55/02 305/142 |
| 2014/0151136 A1* | 6/2014 | Boyle | .................... | B62D 11/02 180/6.2 |
| 2014/0198062 A1* | 7/2014 | Kreutzer | ................ | G06F 1/1643 345/173 |
| 2016/0318423 A1* | 11/2016 | Thibault | .................... | E01H 4/02 |

\* cited by examiner

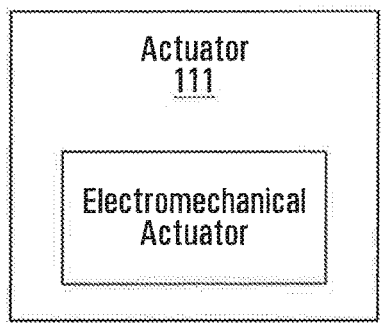
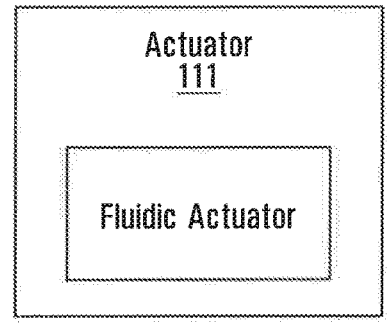
FIG. 30    FIG. 31
FIG. 32

TRACK SYSTEM FOR TRACTION OF A VEHICLE

CROSS-REFERENCE TO RELATED APPLICATION

This application claims priority from U.S. Provisional Patent Application Ser. No. 62/250,246 filed on Nov. 3, 2015 and incorporated by reference herein.

FIELD OF THE INVENTION

The invention relates to track systems for traction of vehicles, such as all-terrain vehicles (ATVs) and other off-road vehicles.

BACKGROUND

Certain vehicles, such as all-terrain vehicles (ATVs), agricultural vehicles (e.g., tractors, harvesters, etc.), may be equipped with track systems which enhance their traction and floatation on soft, slippery and/or irregular grounds (e.g., soil, mud, sand, ice, snow, etc.) on which they operate.

A track system may comprise an anti-rotation device to restrict movement of the track system relative to a chassis of the vehicle to which it provides traction, including a pivoting movement of the track system in relation to the vehicle's chassis. The anti-rotation device may sometimes be adjustable using a wrench, screwdriver, and/or other tools to tune a performance of the track system. However, this adjustment process can be complex, time-consuming, and/or otherwise impractical and can result in inadequate adjustment of the anti-rotation device and, therefore, inadequate tuning of the track system's performance.

For these and other reasons, there is a need to improve track systems for vehicles.

SUMMARY OF THE INVENTION

In accordance with various aspects of the invention, there is provided a track system for traction of a vehicle. The track system comprises a track and a track-engaging assembly for driving and guiding the track around the track-engaging assembly. The track system may be configured to facilitate adjustment of certain aspects of its operation, including, for example, how it is positioned and/or can move relative to a frame of the vehicle, based on one or more factors, such as, for instance, a user's preferences (e.g., riding style, desire to "feel" the ground, etc.), an environment of the track system (e.g., a profile of the ground, such as a slope or steepness or a levelness of the ground; a compliance of the ground, such as a softness or hardness of the ground, etc.), a state of the track system (e.g., a speed and/or a direction of motion of the track, etc.), a state of the vehicle (e.g., a speed and/or direction of the vehicle, etc.), and/or any other suitable factor. For instance, the track system may comprise a control mechanism configured to adjust an anti-rotation device which is configured to restrict movement of the track system relative to the frame of the vehicle. The control mechanism may be configured to adjust the anti-rotation device in response to a command, which may be input via a user interface or automatically generated by a controller.

For example, in accordance with an aspect of the invention, there is provided a track system for traction of a vehicle. The vehicle comprises a powertrain and a frame supporting the powertrain. The track system comprises a track and a track-engaging assembly for driving and guiding the track around the track-engaging assembly. The track comprises a ground-engaging outer side for engaging the ground and an inner side opposite to the ground-engaging outer side. The track-engaging assembly comprises a frame and a drive wheel for imparting motion to the track. The track system further comprises an anti-rotation device configured to restrict movement of the track system relative to the frame of the vehicle and a control mechanism configured to adjust the anti-rotation device in response to a command. The anti-rotation device is connectable between the frame of the track system and the frame of the vehicle.

In accordance with another aspect of the invention, there is provided a track system for traction of a vehicle. The vehicle comprises a powertrain and a frame supporting the powertrain. The track system comprises a track and a track-engaging assembly for driving and guiding the track around the track-engaging assembly. The track comprises a ground-engaging outer side for engaging the ground and an inner side opposite to the ground-engaging outer side. The track-engaging assembly comprises a frame and a drive wheel for imparting motion to the track. The track system further comprises an anti-rotation device configured to restrict movement of the track system relative to the frame of the vehicle and a control mechanism configured to adjust the anti-rotation device toollessly. The anti-rotation device is connectable between the frame of the track system and the frame of the vehicle.

In accordance with another aspect of the invention, there is provided a track system for traction of a vehicle. The vehicle comprises a powertrain and a frame supporting the powertrain. The track system comprises a track and a track-engaging assembly for driving and guiding the track around the track-engaging assembly. The track comprises a ground-engaging outer side for engaging the ground and an inner side opposite to the ground-engaging outer side. The track-engaging assembly comprises a frame and a drive wheel for imparting motion to the track. The track system further comprises an anti-rotation device configured to restrict movement of the track system relative to the frame of the vehicle and a control mechanism configured to allow a user to adjust the anti-rotation device toollessly. The anti-rotation device is connectable between the frame of the track system and the frame of the vehicle.

In accordance with another aspect of the invention, there is provided a track system for traction of a vehicle. The vehicle comprises a powertrain and a frame supporting the powertrain. The track system comprises a track and a track-engaging assembly for driving and guiding the track around the track-engaging assembly. The track comprises a ground-engaging outer side for engaging the ground and an inner side opposite to the ground-engaging outer side. The track-engaging assembly comprises a frame and a drive wheel for imparting motion to the track. The track system further comprises an anti-rotation device configured to restrict movement of the track system relative to the frame of the vehicle and a control mechanism configured to adjust the anti-rotation device automatically. The anti-rotation device is connectable between the frame of the track system and the frame of the vehicle.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 30 and 31 respectively show embodiments in which the actuator is an electromechanical actuator and a fluidic actuator;

FIG. 32 shows a flow diagram depicting a controller of the control mechanism for automatically generating the adjust command;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1A:
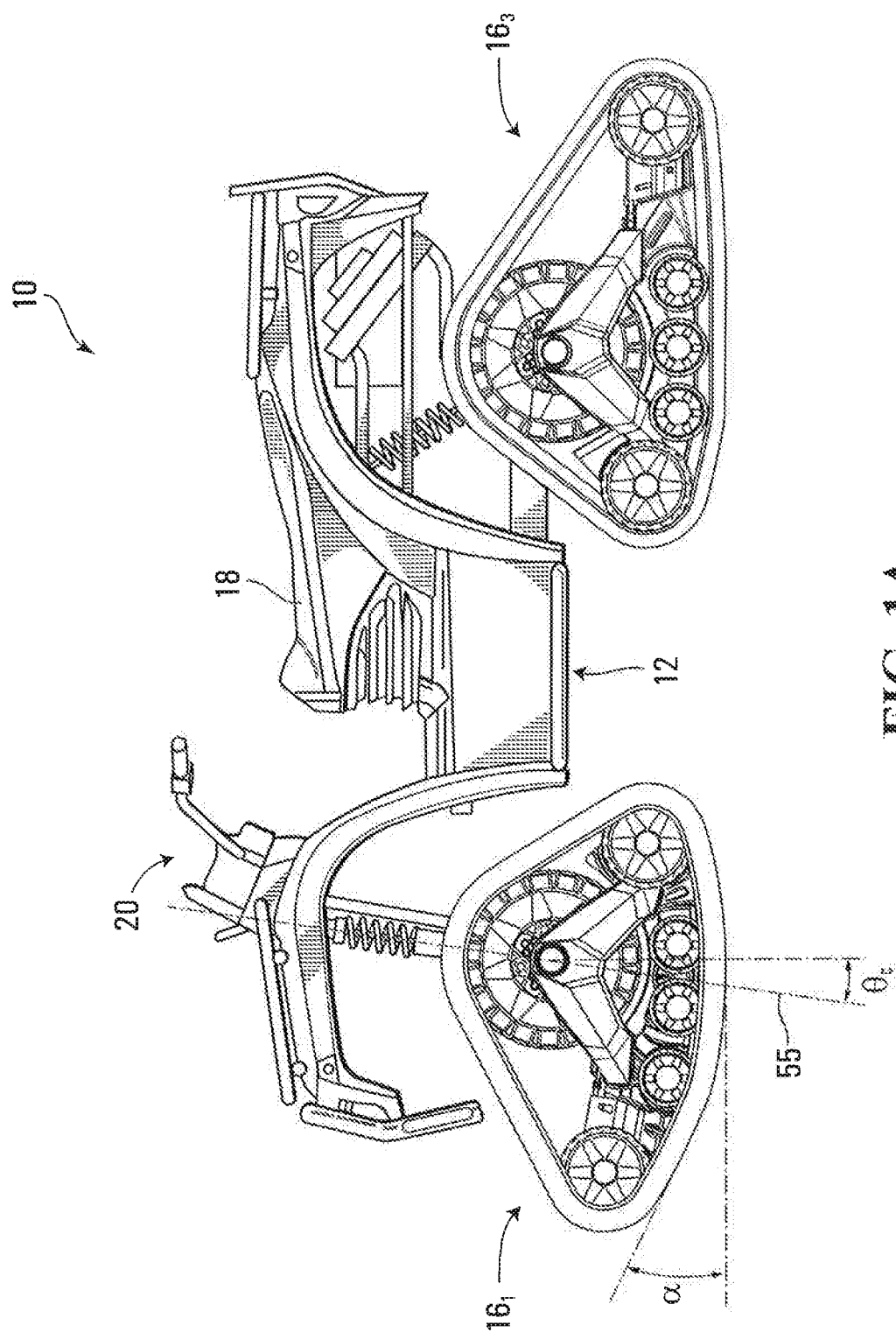
FIGS. 1A and 1B show an example of an all-terrain vehicle (ATV) comprising track systems in accordance with an embodiment of the invention.
Figure 1B:
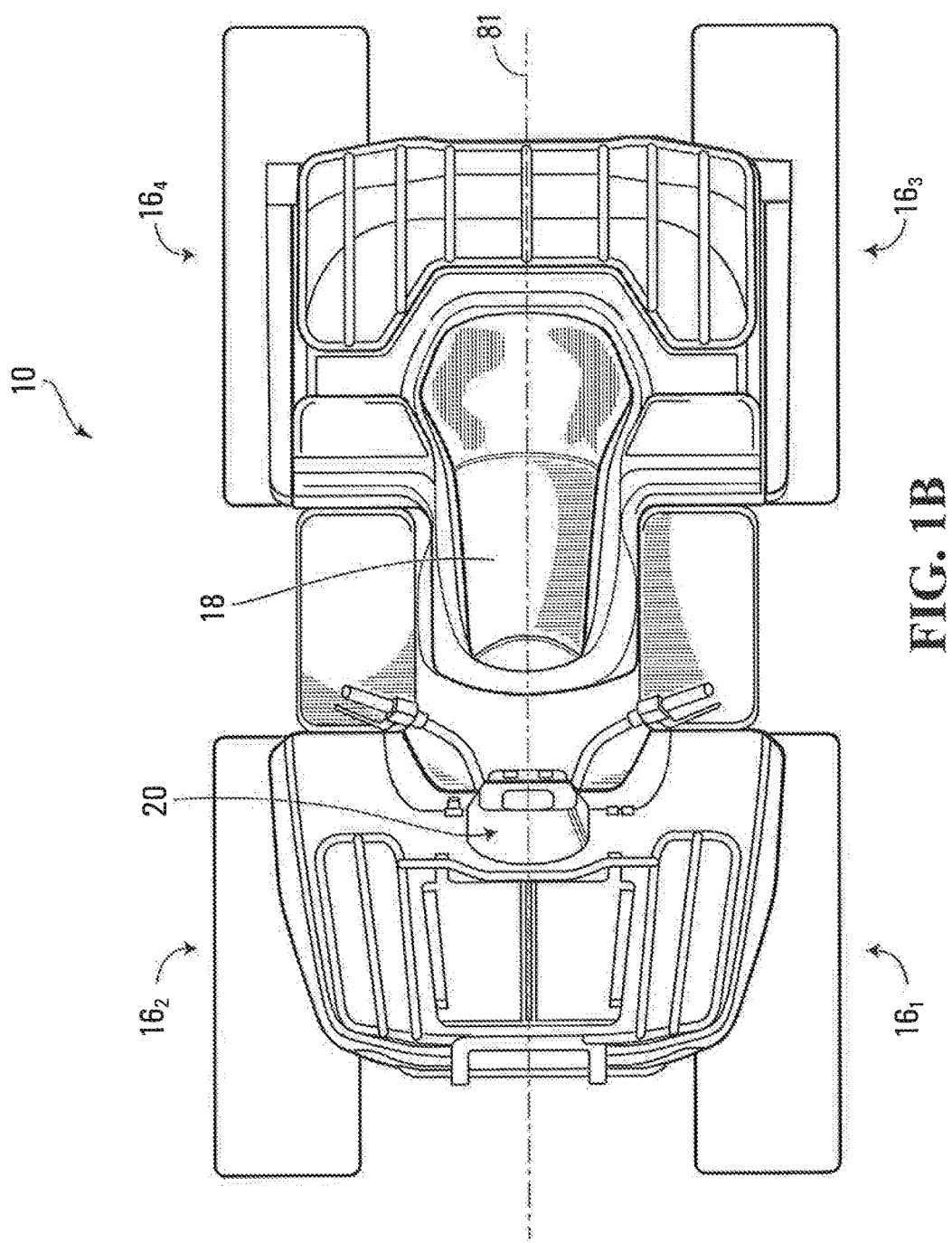

FIGS. 1A and 1B show an example of an all-terrain vehicle (ATV) 10 in accordance with an embodiment of the invention. The ATV 10 is a small open vehicle designed to travel off-road on a variety of terrains, including roadless rugged terrain, for recreational, utility and/or other purposes.

In this embodiment, the ATV 10 comprises a frame 11, a powertrain 13, a plurality of track systems $16_1$-$16_4$, a seat 18, and a user interface 20, which enable a user of the ATV 10 to ride the ATV 10 on the ground.

As further discussed later, in various embodiments, each track system $16_i$ may be designed to facilitate adjustment of certain aspects of its operation, including, for example, how it is positioned and/or can move relative to the frame 11 of the ATV 10, based on one or more factors, such as, for instance, the user's preferences (e.g., riding style, desire to "feel" the ground, etc.), an environment of the track system $16_i$ (e.g., a profile of the ground, such as a slope or steepness or a levelness of the ground; a compliance of the ground, such as a softness or hardness of the ground, etc.), a state of the track system $16_i$ (e.g., a speed and/or a direction of motion of its track, etc.), a state of the ATV 10 (e.g., a speed and/or direction of the ATV 10, etc.), and/or any other suitable factor.

The powertrain 13 is configured for generating motive power and transmitting motive power to the track systems $16_1$-$16_4$ to propel the ATV 10 on the ground. To that end, the powertrain 13 comprises a prime mover 12 which is a source of motive power that comprises one or more motors. For example, in this embodiment, the prime mover 12 comprises an internal combustion engine. In other embodiments, the prime mover 12 may comprise another type of motor (e.g., an electric motor) or a combination of different types of motor (e.g., an internal combustion engine and an electric motor). The prime mover 12 is in a driving relationship with one or more of the track systems $16_1$-$16_4$. That is, the powertrain 13 transmits motive power generated by the prime mover 12 to one or more of the track systems $16_1$-$16_2$. The powertrain 13 may transmit power from the prime mover 12 to the track systems $16_1$-$16_4$ in any suitable way (e.g., via a transmission and a differential).

In this case, the seat 18 is a straddle seat and the ATV 10 is usable by a single person such that the seat 18 accommodates only that person driving the ATV 10. In other cases, the seat 18 may be another type of seat, and/or the ATV 10 may be usable by two individuals, namely one person driving the ATV 10 and a passenger, such that the seat 18 may accommodate both of these individuals (e.g., behind one another or side-by-side) or the ATV 10 may comprise an additional seat for the passenger. For example, in other embodiments, the ATV 10 may be a side-by-side ATV, sometimes referred to as a "utility terrain vehicle" or "UTV".

The user interface 20 allows the user to interact with the ATV 10. More particularly, the user interface 20 comprises an accelerator, a brake control, and a steering device that are operated by the user to control motion of the ATV 10 on the ground. In this case, the steering device comprises handlebars. In other cases, the steering device may comprise a steering wheel or other type of steering element. The user interface 20 also comprises an instrument panel (e.g., a dashboard) which provides indicators (e.g., a speedometer indicator, a tachometer indicator, etc.) to convey information to the user.

The track systems $16_1$-$16_4$ engage the ground to provide traction to the ATV 10. More particularly, in this example, front ones of the track systems $16_1$-$16_4$ provide front traction to the ATV 10 while rear ones of the track systems $16_1$-$16_4$ provide rear traction to the ATV 10. Each of the front ones of the track systems $16_1$-$16_4$ is pivotable about a steering axis of the ATV 10 by a steering mechanism of the ATV 10 in response to input of the user at the handlebars to change an orientation of the that track system relative to the frame 11 of the ATV 10 in order to steer the ATV 10 on the ground.

Figure 2A:
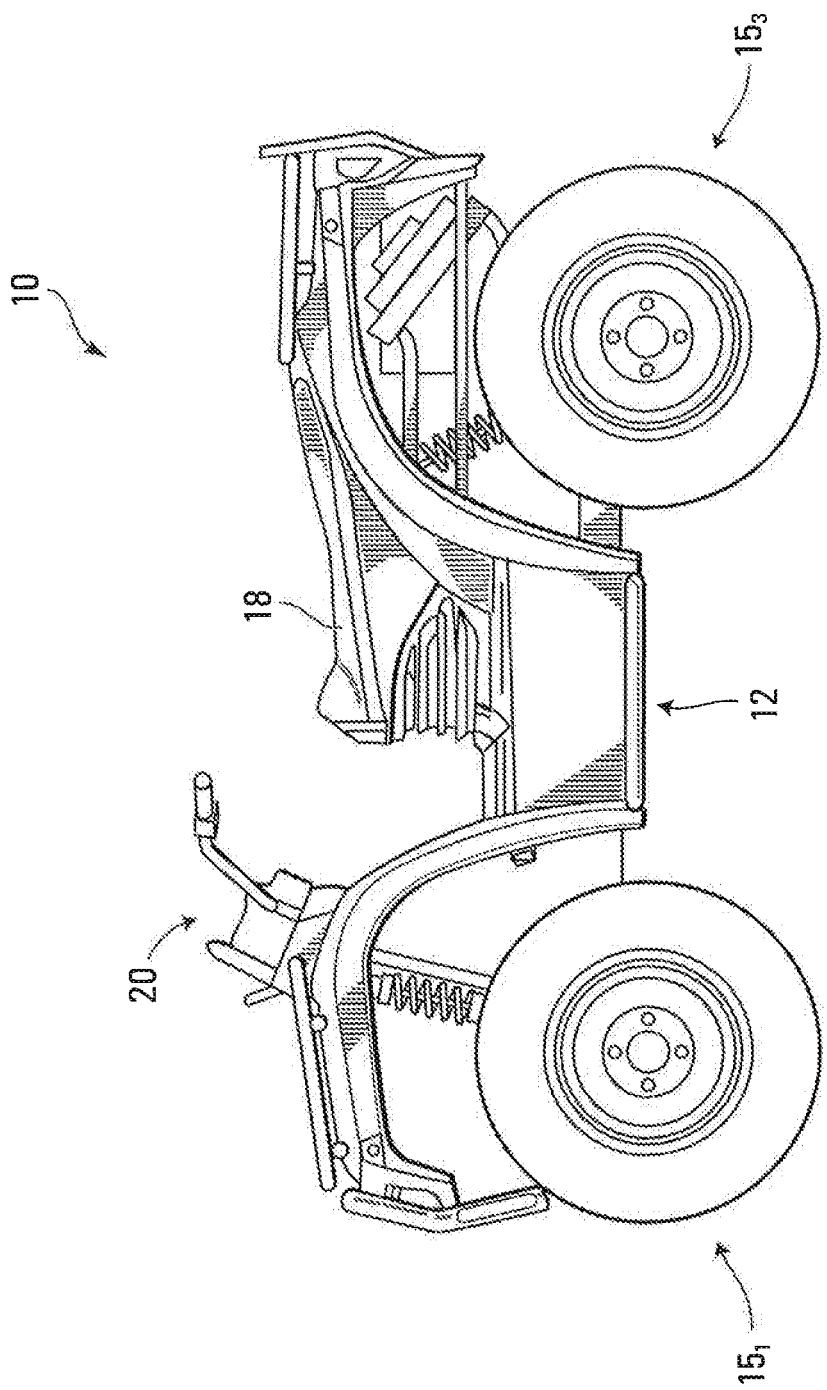
FIGS. 2A and 2B show the ATV equipped with ground-engaging wheels instead of the track systems.
Figure 2B:
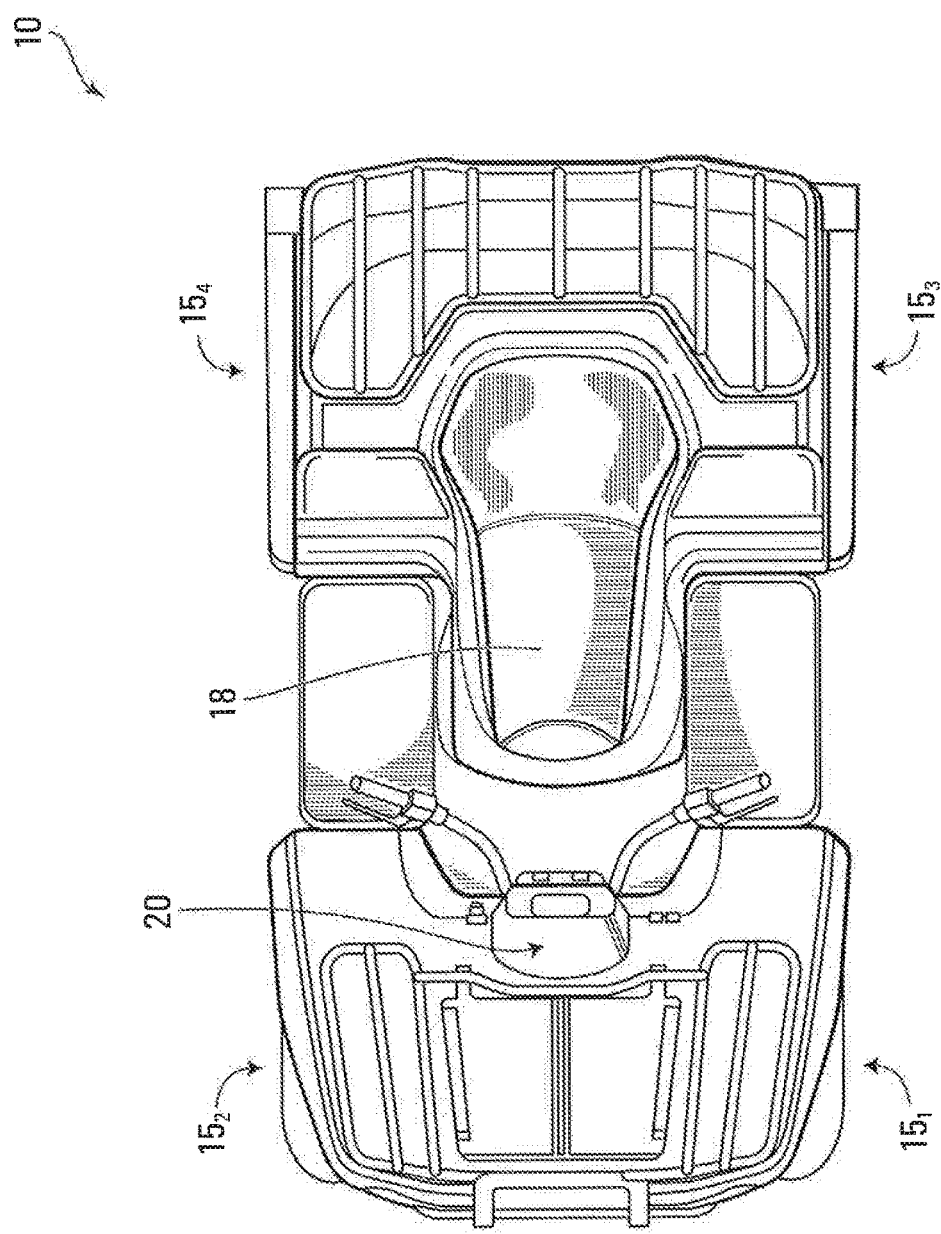
Figure 3:
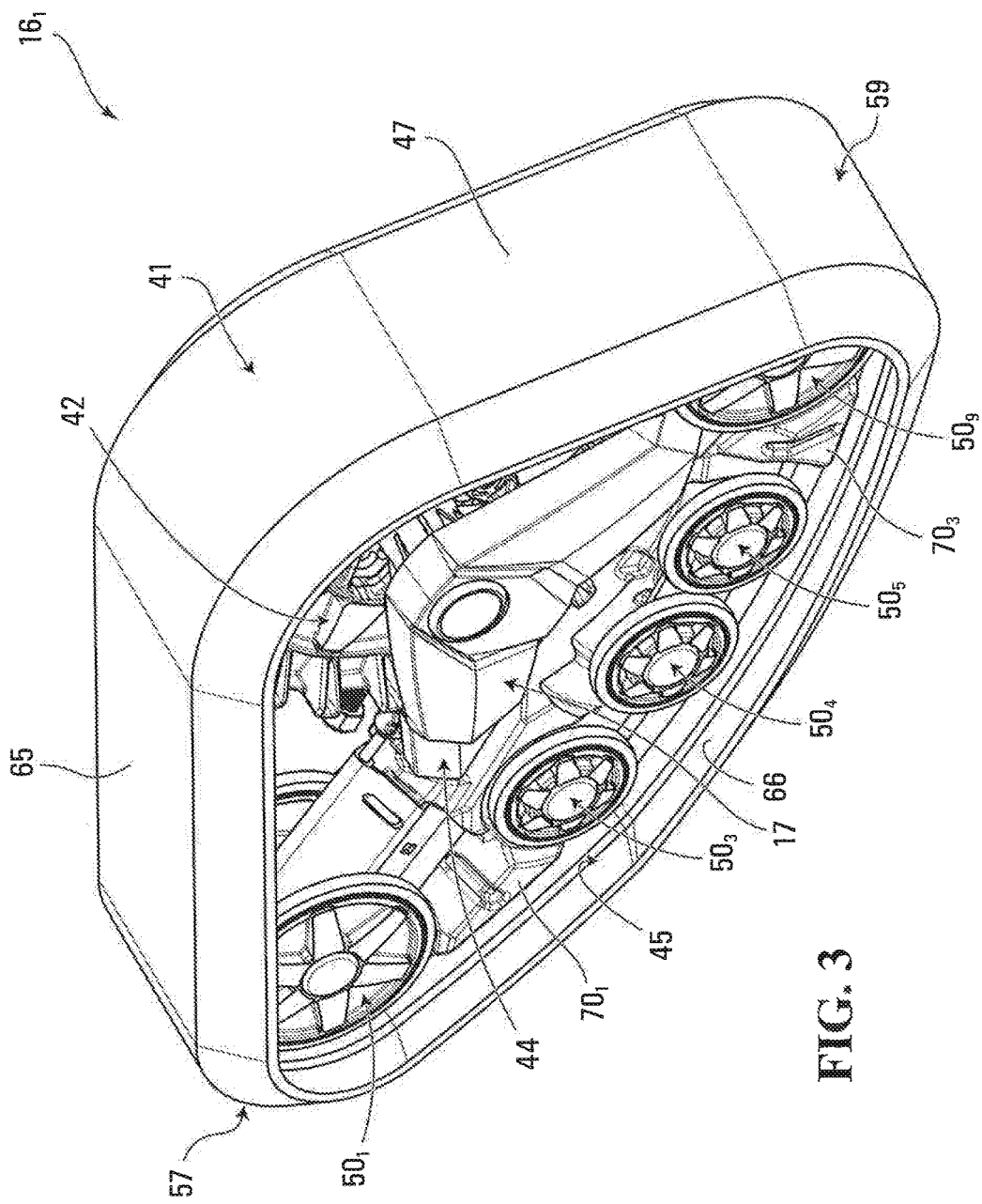
FIGS. 3 and 4 show perspective views of a front one and a rear one of the track systems.
Figure 4:
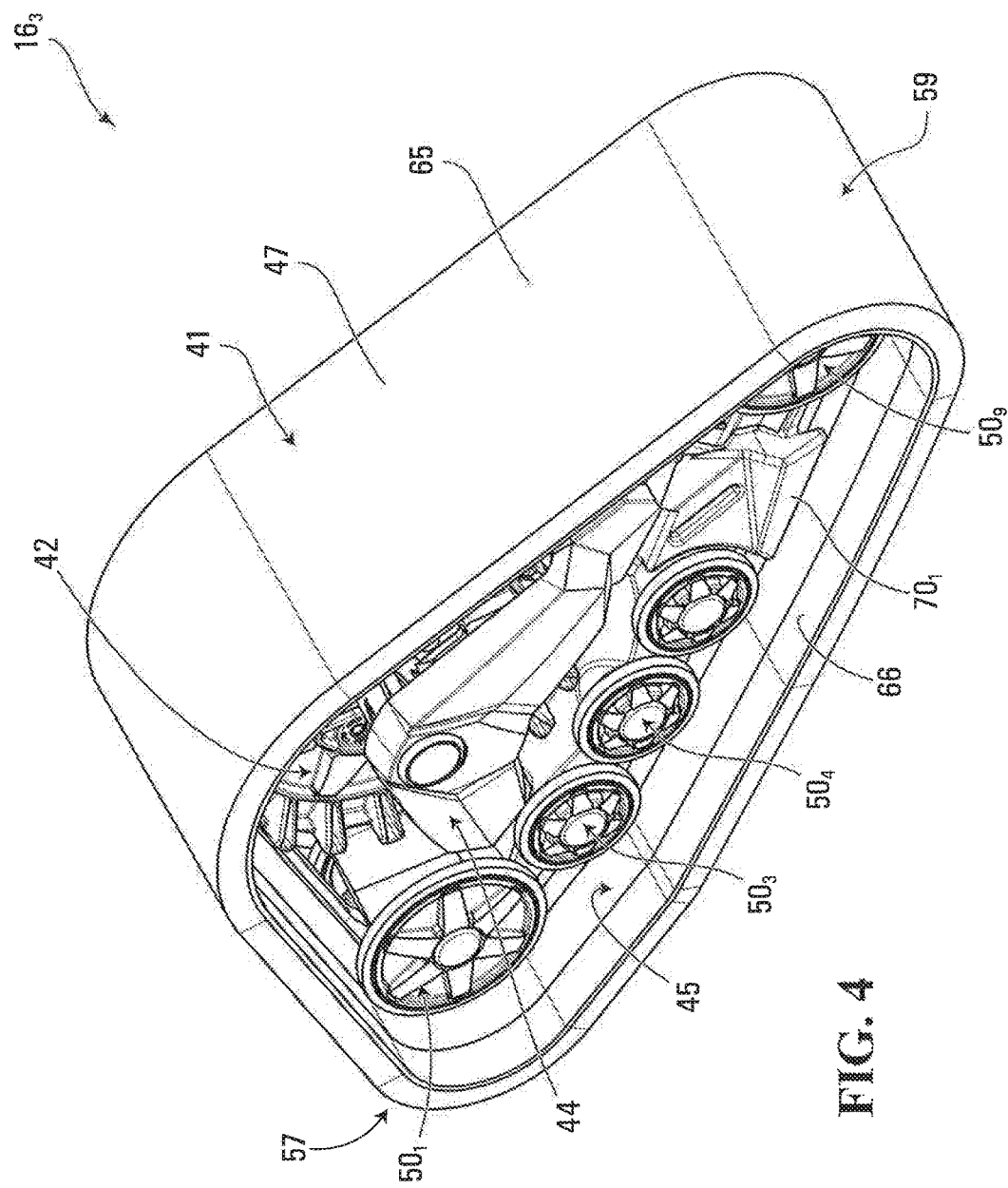
Figure 5:
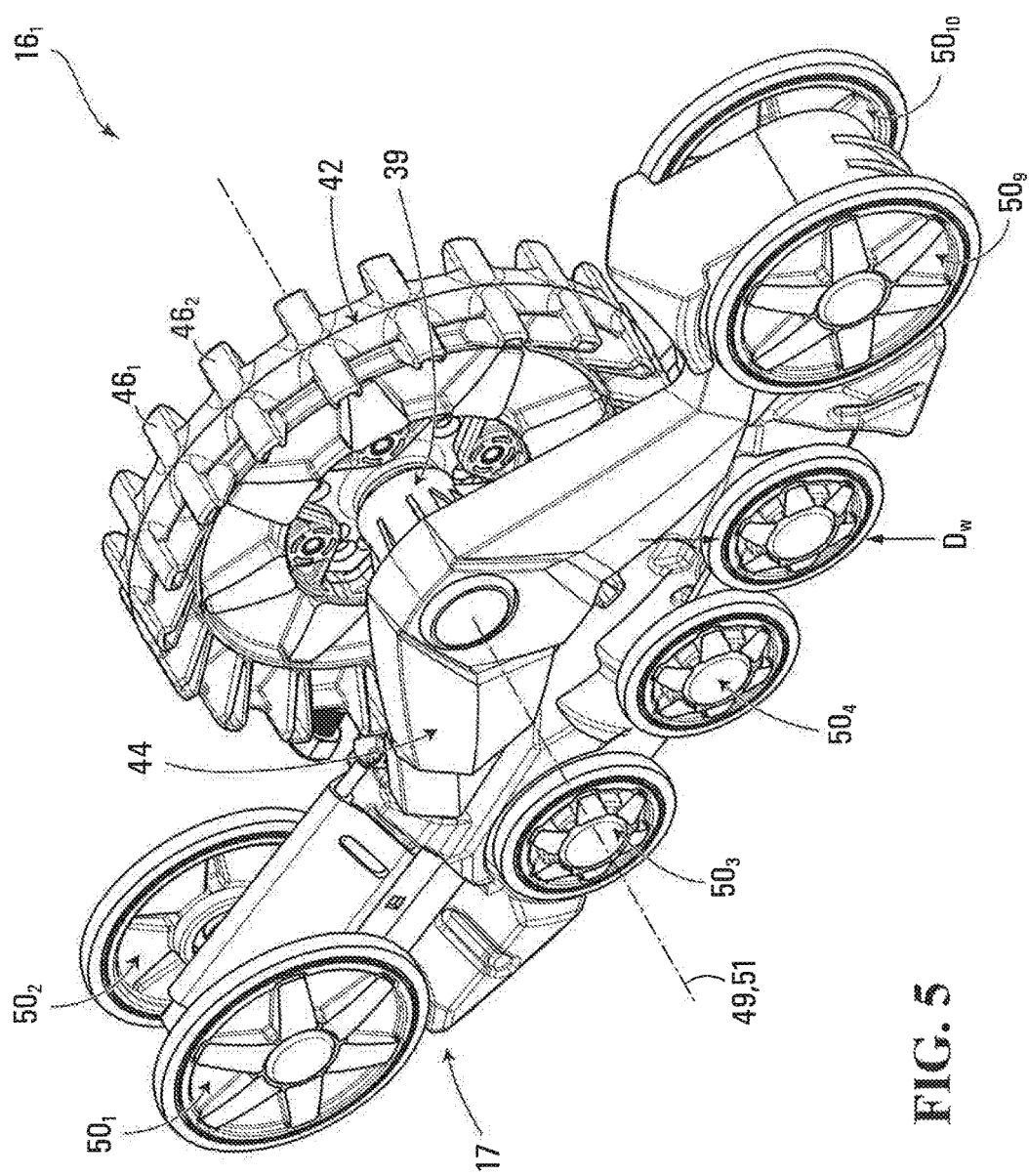
FIGS. 5 and 6 show perspective views of the front one and the rear one of the track systems without their track.
Figure 6:
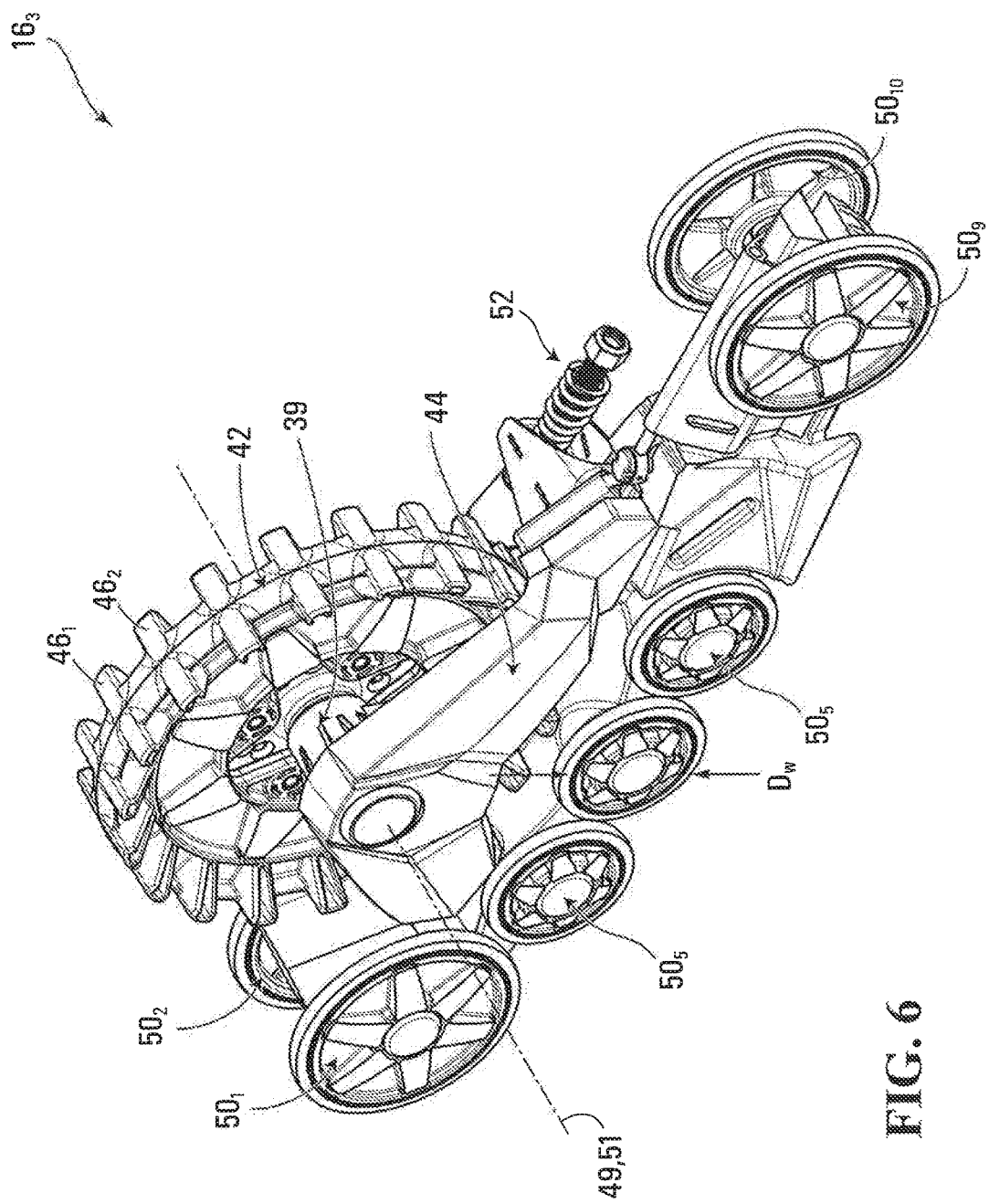
Figure 7:
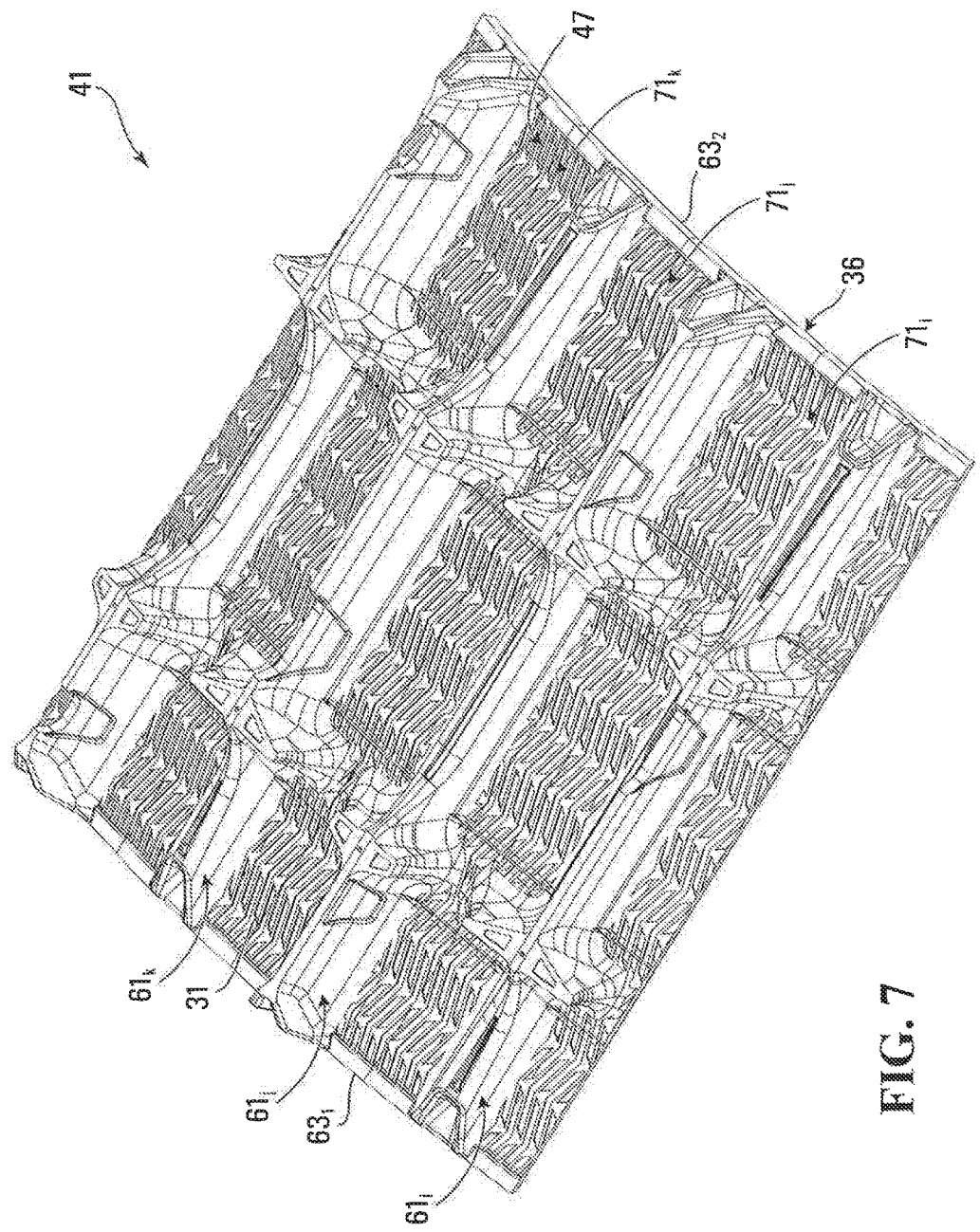
FIGS. 7 and 8 show perspective views of a segment of the track of the rear track system, which depict features of an inner side and a ground-engaging outer side of the track that are not depicted in FIGS. 1A, 1B, 3 and 4, including traction projections of the track.
Figure 8:
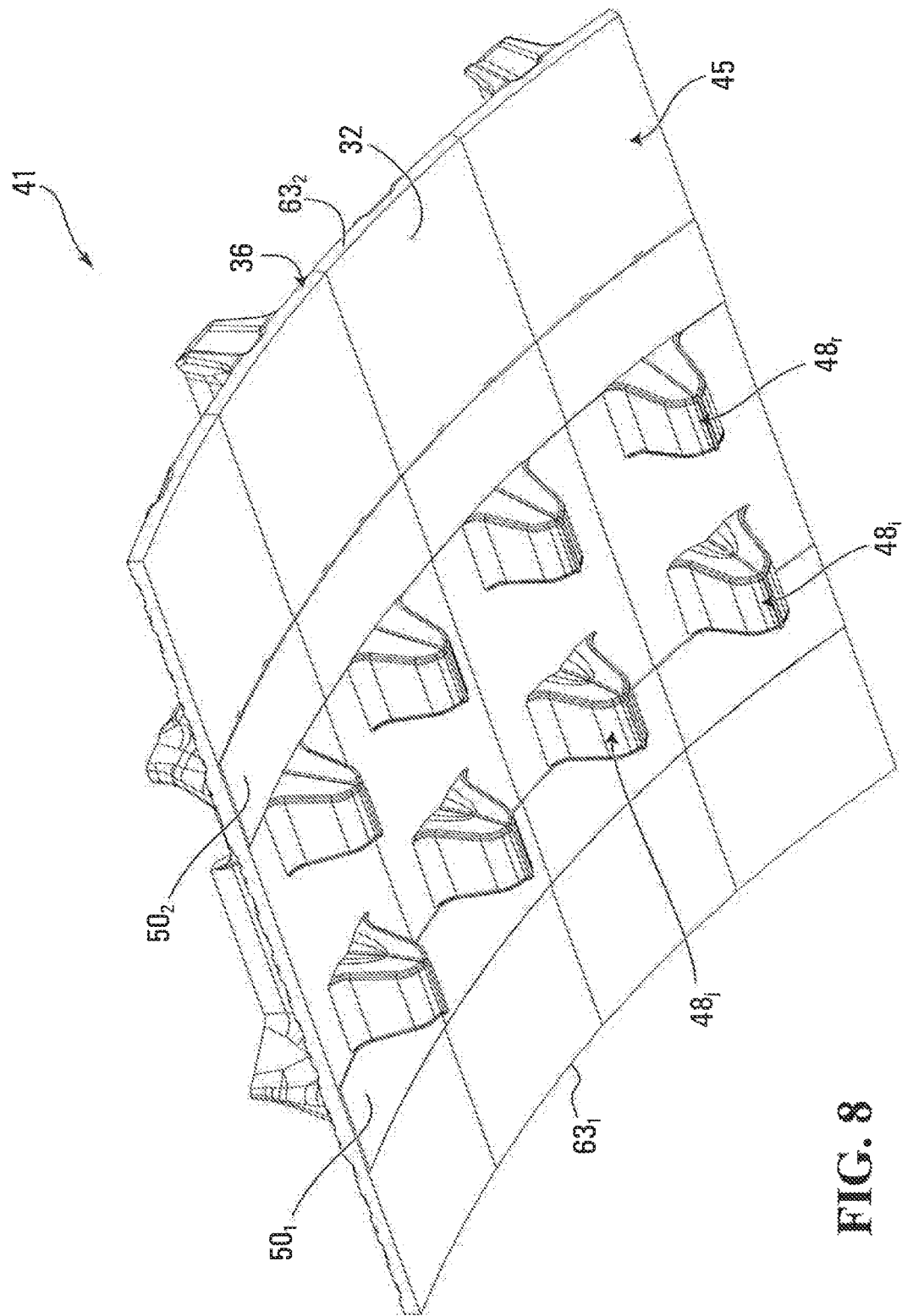
Figure 9:
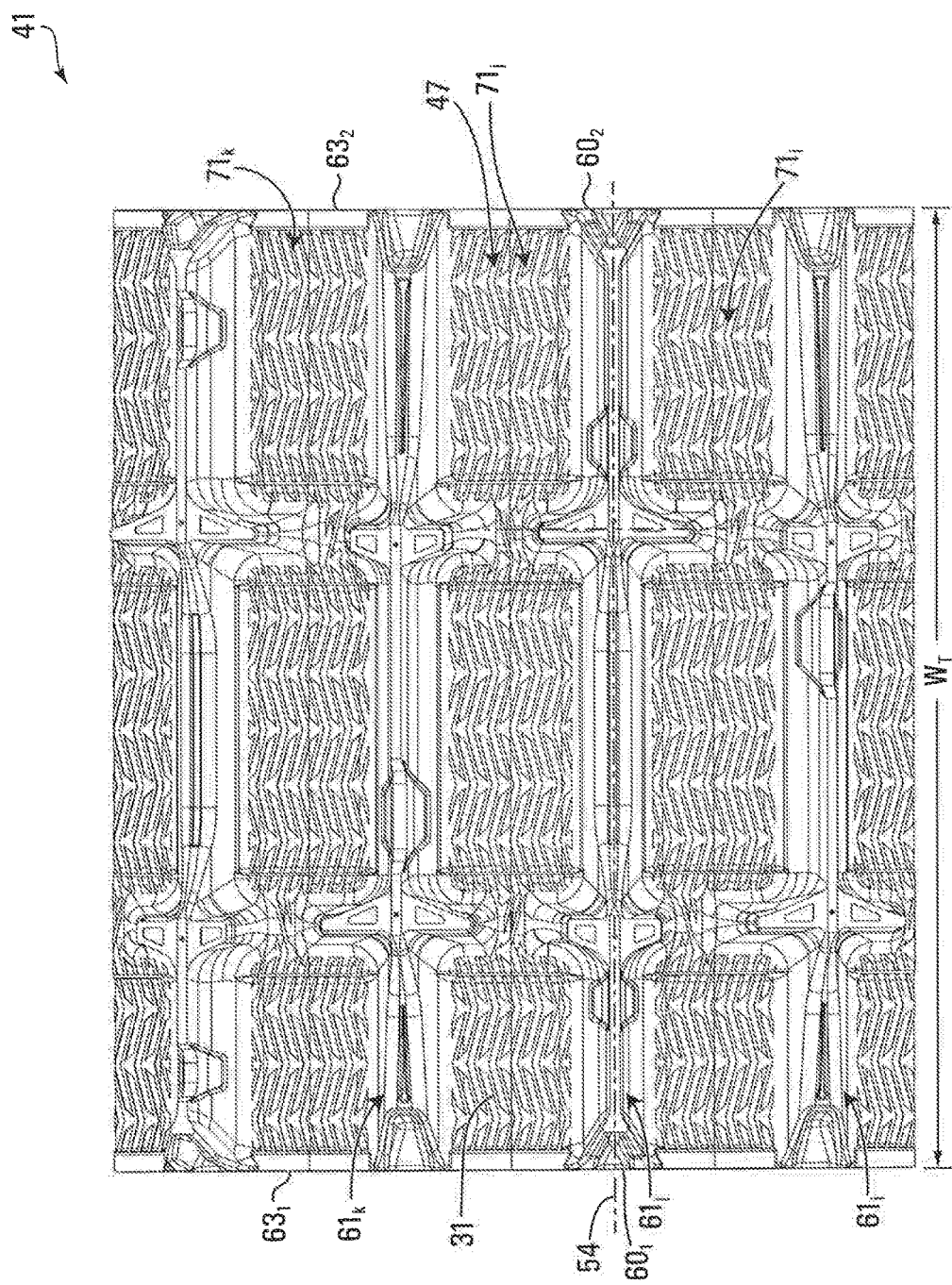
FIGS. 9 and 10 show views of the ground-engaging outer side and the inner side of the track of the rear track system.
Figure 10:
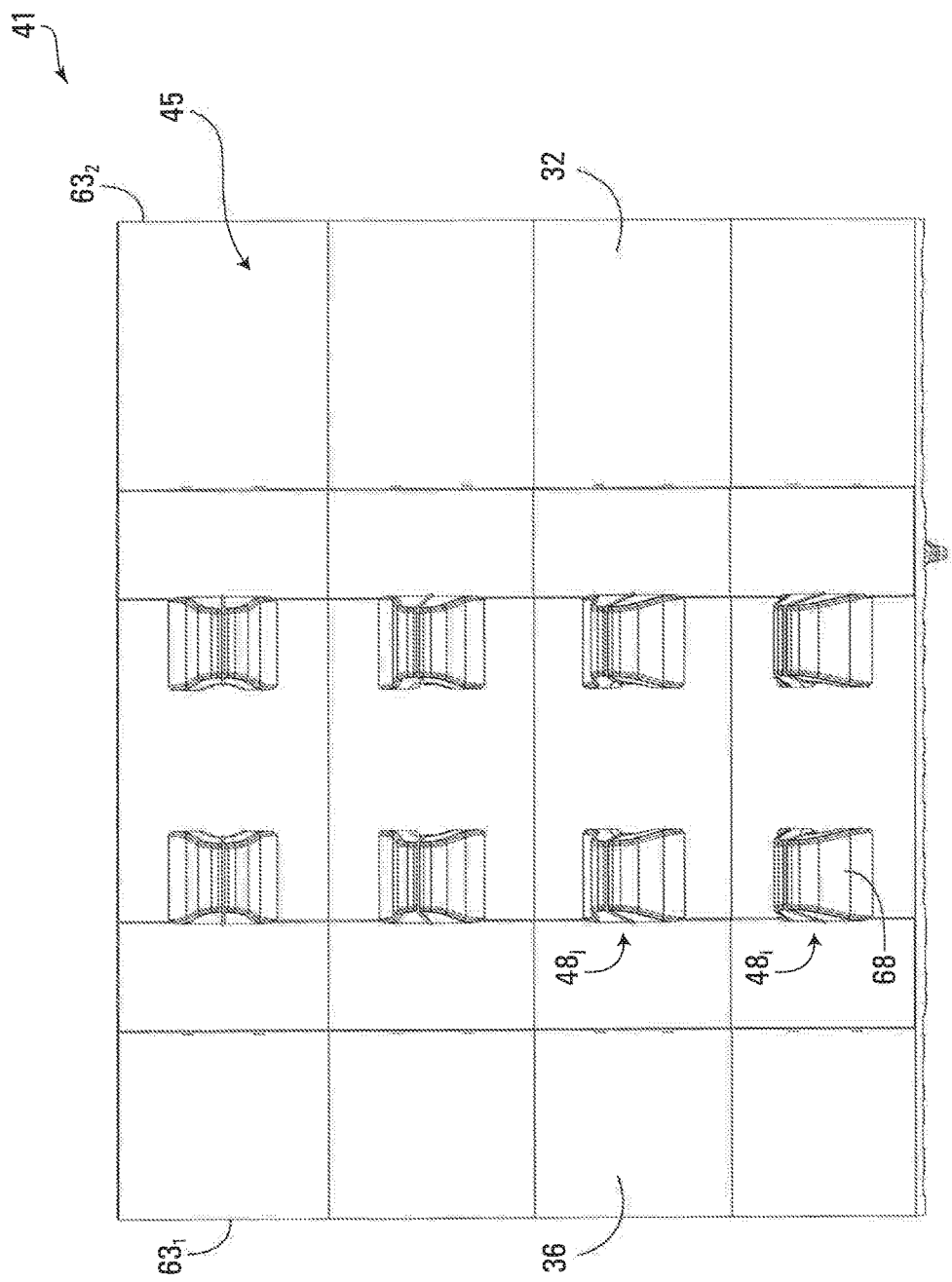
Figure 11:
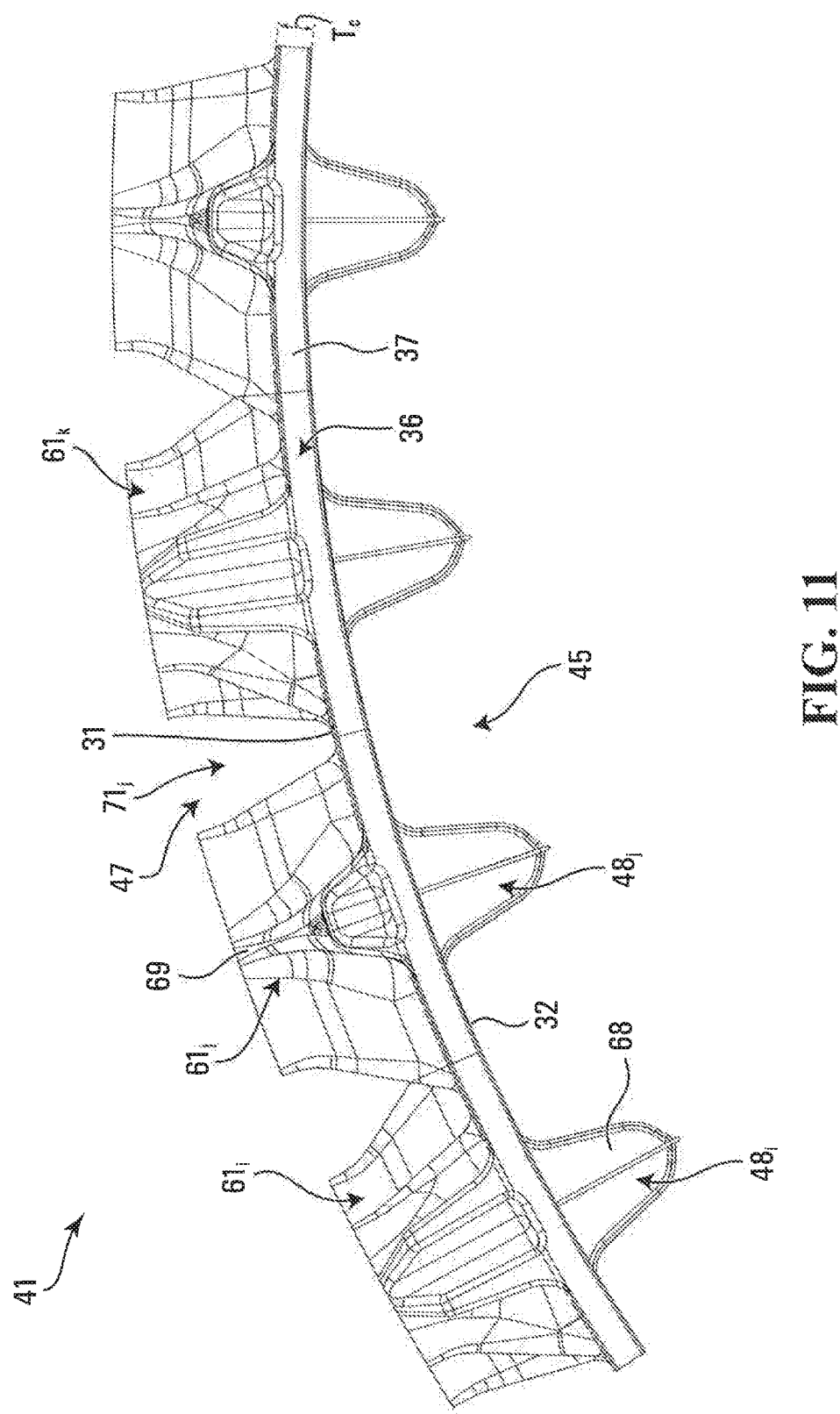
FIG. 11 shows a side view of the track of the rear track system.

In this embodiment, each track system $16_i$ is mounted in place of a ground-engaging wheel that may otherwise be mounted at a position of the track system $16_i$ to propel the ATV 10 on the ground. For example, as shown in FIGS. 2A and 2B, the ATV 10 may be propelled on the ground by four ground-engaging wheels $15_1$-$15_4$ with tires instead of the track systems $16_1$-$16_4$. Basically, in this embodiment, the track systems $16_1$-$16_4$ may be used to convert the ATV 10 from a wheeled vehicle into a tracked vehicle, thereby enhancing its traction and floatation on the ground.

With additional reference to FIGS. 3 to 6, in this embodiment, each track system $16_i$ comprises a track-engaging assembly 17 and a track 41 disposed around the track-engaging assembly 17. In this example, the track-engaging assembly 17 comprises a frame 44 and a plurality of track-contacting wheels which includes a drive wheel 42 and a plurality of idler wheels $50_1$-$50_{10}$, which includes leading idler wheels $50_1$, $50_2$, trailing idler wheels $50_9$, $50_{10}$, and support wheels $50_3$-$50_8$ between the leading idler wheels $50_1$, $50_2$ and the trailing idler wheels $50_9$, $50_{10}$. The track system $16_i$ has a front longitudinal end 57 and a rear longitudinal end 59 that define a length of the track system $16_i$. A width of the track system $16_i$ is defined by a width $W_T$ of the track 41. The track system $16_i$ has a longitudinal direction, a widthwise direction, and a height direction.

The track 41 engages the ground to provide traction to the ATV 10. A length of the track 41 allows the track 41 to be mounted around the track-engaging assembly 17. In view of its closed configuration without ends that allows it to be disposed and moved around the track-engaging assembly 17, the track 41 can be referred to as an "endless" track. Referring additionally to FIGS. 7 to 11, the track 41 comprises an inner side 45 facing the wheels 42, $50_1$-$50_{10}$ and defining an inner area of the track 41 in which these wheels are located. The track 41 also comprises a ground-engaging outer side 47 opposite the inner side 45 for engaging the ground on which the ATV 10 travels. Lateral edges $63_1$, $63_2$ of the track 41 define the track's width $W_T$. The track 41 has a top run 65 which extends between the longitudinal ends 57, 59 of the track system $16_i$ and over the track-engaging assembly 17, and a bottom run 66 which extends between the longitudinal ends 57, 59 of the track system $16_i$ and under the track-engaging assembly 17. The track 41 has a longitudinal direction, a widthwise direction, and a thickness direction.

The track 41 is elastomeric, i.e., comprises elastomeric material, allowing it to flex around the wheels 42, $50_1$-$50_{10}$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 37 which allows the track 41 to flex around the wheels 42, $50_1$-$50_{10}$.

Figure 12:
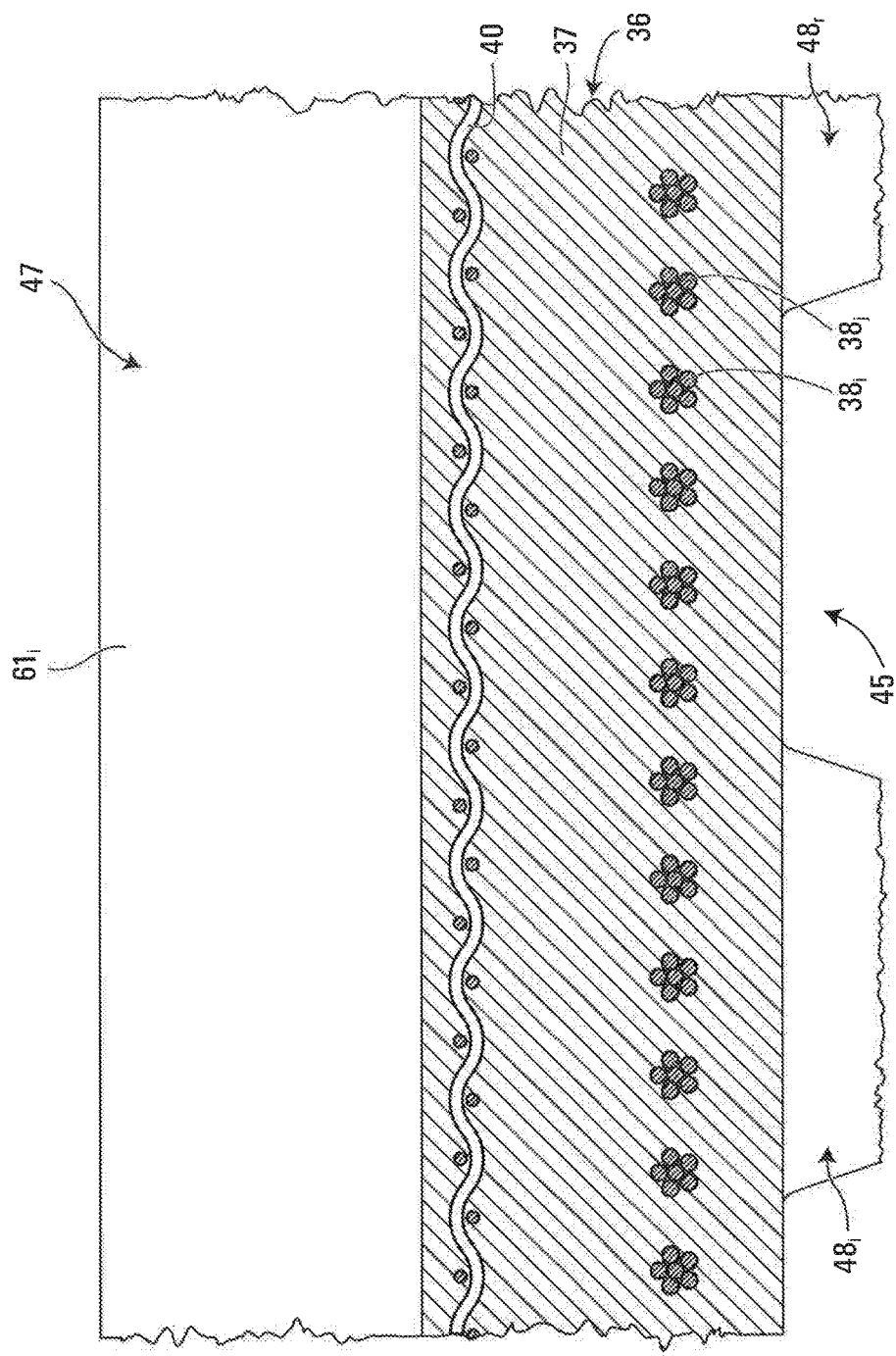
FIG. 12 shows a partial cross-sectional view of the track of the rear track system.

As shown in FIG. 12, in this embodiment, the carcass 36 comprises a plurality of reinforcements embedded in its elastomeric material 37. One example of a reinforcement is a layer of reinforcing cables $38_1$-$38_C$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 37 is cured. For example, in this embodiment, layers of elastomeric material providing the elastomeric material 37 of the carcass 36, the reinforcing cables $38_1$-$38_C$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections $48_1$-$48_N$ that project from the inner surface 32 to contact at least some of the wheels 42, $50_1$-$50_{10}$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_{10}$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track 41. In this case, the drive/guide lugs $48_1$-$48_N$ are arranged in a plurality of rows that are spaced apart along the widthwise direction of the track 41. The drive/guide lugs $48_1$-$48_N$ may be arranged in other manners in other embodiments (e.g., a single row or more than two rows). Each of the drive/guide lugs $48_1$-$48_N$ is an elastomeric drive/guide lug in that it comprises elastomeric material 68. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs" or "traction profiles", are spaced apart in the longitudinal direction of the track system $16_i$. The ground-engaging outer side 47 comprises a plurality of traction-projection-free areas $71_1$-$71_F$ (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

Each traction projection $61_i$ extends transversally to the longitudinal direction of the track 41. That is, the traction projection $61_i$ has a longitudinal axis 54 extending transversally to the longitudinal direction of the track 41. In this example, the longitudinal axis 54 of the traction projection $61_i$ is substantially parallel to the widthwise direction of the track 41. In other examples, the longitudinal axis 54 of the traction projection $61_i$ may be transversal to the longitudinal direction of the track 41 without being parallel to the widthwise direction of the track 41.

In this embodiment, the traction projection $61_i$ extends across at least a majority of the width $W_T$ of the track 41. More particularly, in this example, the traction projection $61_i$ extends across substantially an entirety of the width $W_T$ of the track 41. The traction projection $61_x$ has longitudinal ends $60_1$, $60_2$ adjacent to respective ones of the lateral edges $63_1$, $63_2$ of the track 41. The traction projection $61_i$ may extend across any suitable part of the width $W_T$ of the endless track 41 in other embodiments.

Also, in this embodiment, the traction projection $61_i$ varies in cross-sectional shape along its longitudinal axis 54. That is, cross-sections of the traction projection $61_i$ at different positions along the longitudinal axis 54 of the traction projection $61_i$ are different.

The traction projections $61_1$-$61_M$ may be configured in various other ways in other embodiments.

In this example, the carcass 36 has a thickness $T_c$ which is relatively small. The thickness $T_c$ of the carcass 36 is measured from the inner surface 32 to the ground-engaging outer surface 31 of the carcass 35 between longitudinally-adjacent ones of the traction projections $61_1$-$61_M$. For example, in some embodiments, the thickness $T_c$ of the carcass 36 may be no more than 0.375 inches, in some cases no more than 0.325 inches, in some cases no more than 0.275 inches, in some cases no more than 0.225 inches, in some cases no more than 0.200 inches, and in some cases even less (e.g., 0.180 or 0.170 inches). The thickness $T_c$ of the carcass 36 may have any other suitable value in other embodiments.

Figure 13:
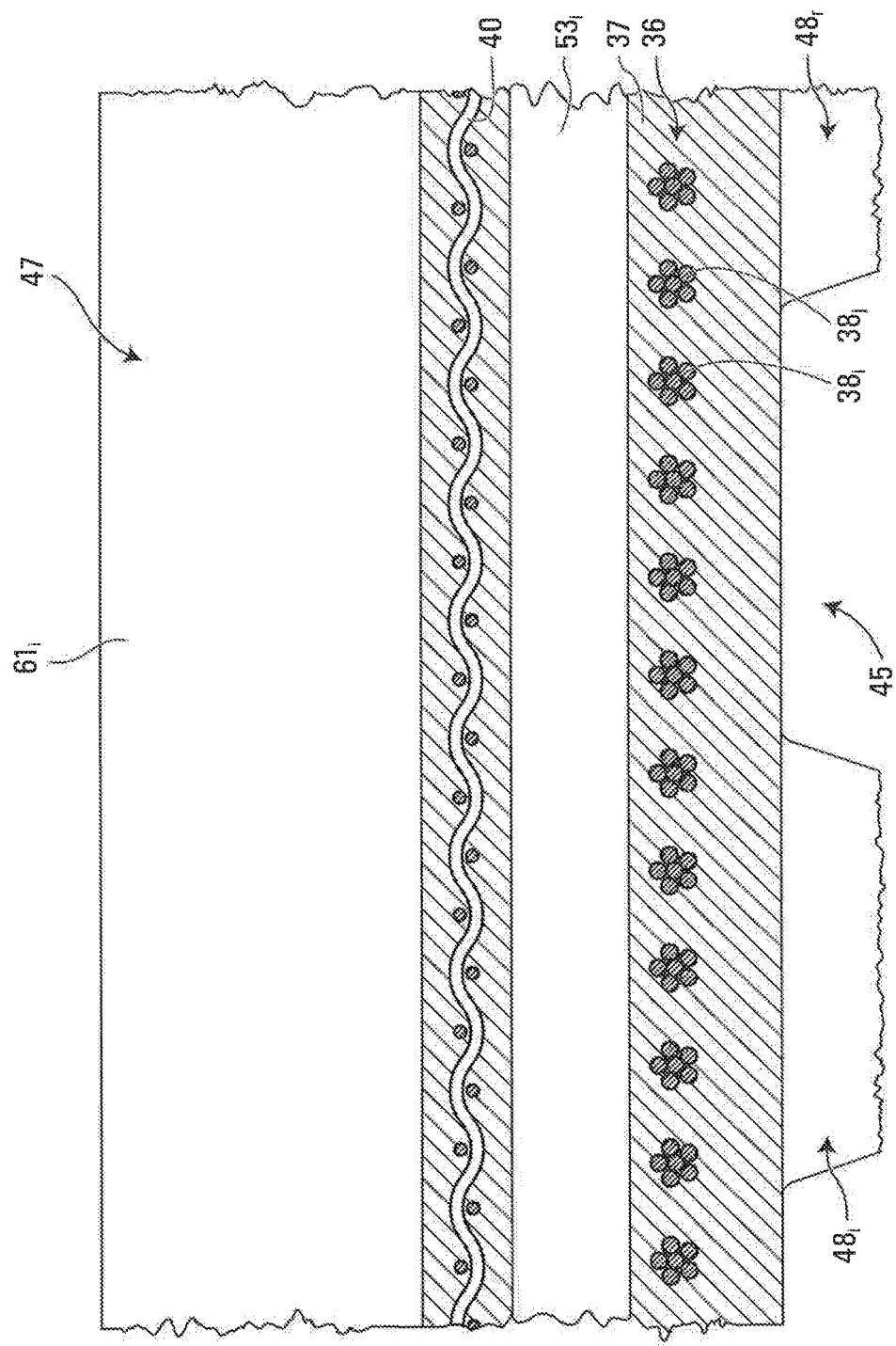
FIG. 13 shows a partial cross-sectional view of a variant of the track of the rear track system.
Figure 14:
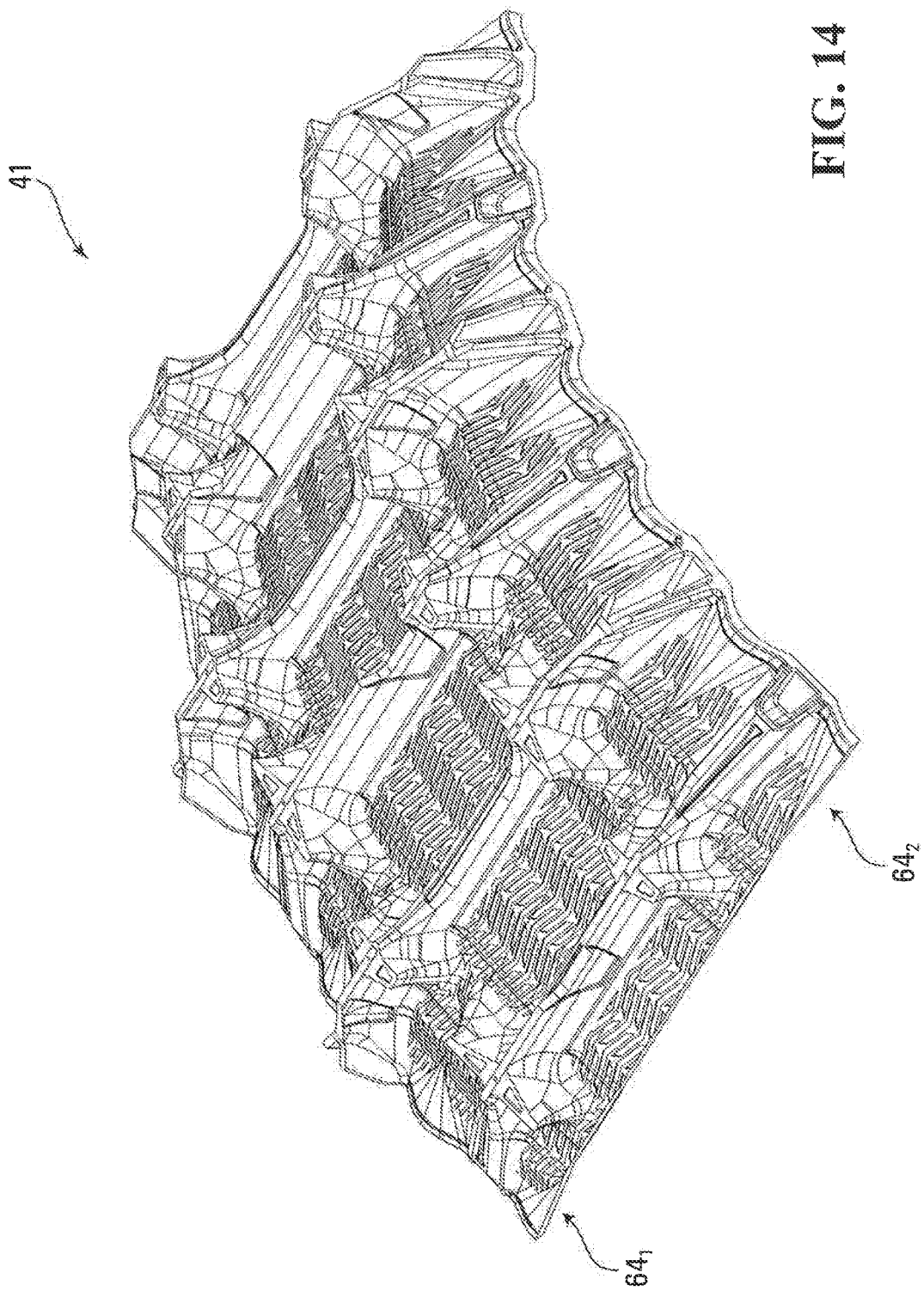
FIGS. 14 and 15 show views of a segment of the track of the front track system, which depict features of an inner side and a ground-engaging outer side of the track that are not depicted in FIGS. 1A, 1B, 3 and 4.
Figure 15:
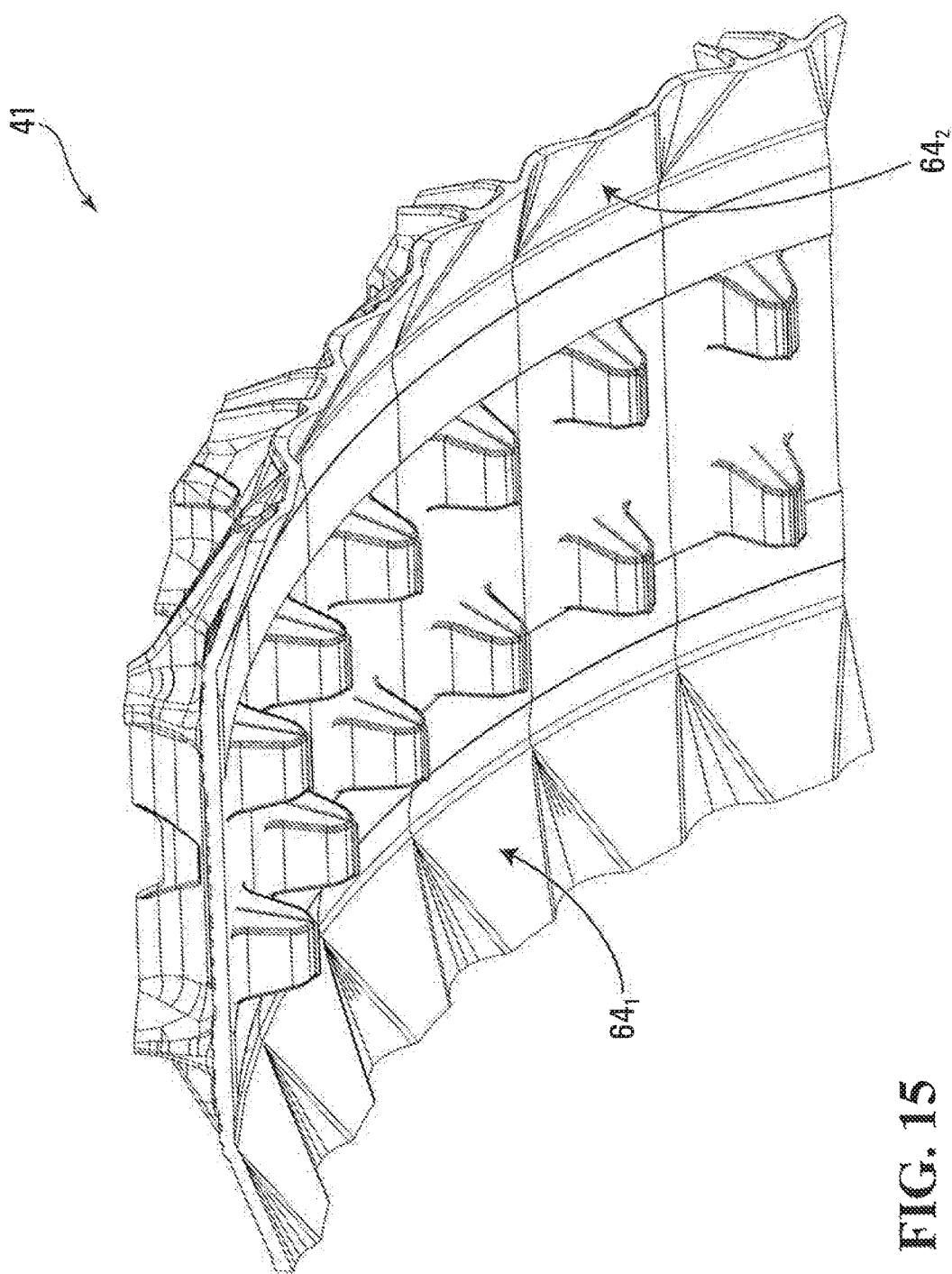

In this embodiment, as shown in FIG. 12, the track 41 is free of transversal stiffening rods embedded in its elastomeric material. That is, the track 41 does not comprise transversal stiffening rods embedded in its elastomeric material and extending transversally to its longitudinal direction. FIG. 13 shows a variant in which the track 41 may comprise transversal stiffening rods $53_1$-$53_M$ embedded in its elastomeric material and extending transversally to its longitudinal direction in other embodiments. This absence of transversal stiffening rods makes the track 41 more flexible in its widthwise direction than if the track 41 had the transversal stiffening rods $53_1$-$53_M$ but was otherwise identical.

The track 41 shown in FIGS. 7 to 11 is that of a given one of the rear track assemblies $16_3$, $16_4$. FIGS. 17 to 23 show the track 41 of a given one of the front track assemblies $16_1$, $16_2$, which is similar to the track 41 of the given one of the rear track assemblies $16_3$, $16_4$, except that it comprises bent lateral edge portions $64_1$, $64_2$ adjacent its lateral edges $63_1$, $63_2$ to facilitate steering of the given one of the front track assemblies $16_1$, $16_2$ on the ground, by creating a smaller ground-contacting area. More particularly, the carcass 36 of the track 41 of the given one of the front track assemblies $16_1$, $16_2$ is bent inwardly proximate the lateral edges $63_1$, $63_2$ of the track 41 such that its inner surface 32 and ground-engaging outer surface 31 are bent inwardly.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle of the ATV 10. In this example, the axis of rotation 49 corresponds to the axle of the ATV 10. More particularly, in this example, the drive wheel 42 has a hub which is mounted to the axle of the ATV 10 such that power generated by the prime mover 12 and delivered over the powertrain 13 of the ATV 10 rotates the axle, which rotates the drive wheel 42, which imparts motion of the track 41. In this embodiment in which the track system $16_i$ is mounted where a ground-engaging wheel $15_i$ could otherwise be mounted, the axle of the ATV 10 is capable of rotating the drive wheel 42 of the track system $16_i$ or the ground-engaging wheel $15_i$.

In this embodiment, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of teeth $46_1$-$46_T$ distributed circumferentially along its rim to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The idler wheels $50_1$-$50_{10}$ are not driven by power supplied by the prime mover 12, but are rather used to do at least one of supporting part of the weight of the ATV 10 on the ground via the track 41, guiding the track 41 as it is driven by the drive wheel 42, and tensioning the track 41. More particularly, in this embodiment, the idler wheels $50_1$, $50_2$ and the idler wheels $50_9$, $50_{10}$ are respectively front idler wheels (leading idler wheels) and rear idler wheels (trailing idler wheels) that maintain the track 41 in tension, and can help to support part of the weight of the ATV 10 on the ground via the track 41. The idler wheels $50_3$-$50_8$ are roller wheels that roll on the inner side 45 of the track 41 along the bottom run 66 of the track 41 to apply the bottom run 66 on the ground. The idler wheels $50_1$-$50_{10}$ move on respective ones of a plurality of idler wheel paths $51_1$, $51_2$ of the inner surface 32 of the carcass 35 of the track 41. Each of the idler wheel paths $51_1$, $51_2$ extends adjacent to respective ones of the drive/guide lugs $48_1$-$48_N$ to allow these lugs to guide motion of the track 41. As the roller wheels $50_3$-$50_8$ roll on respective ones of the idler wheel paths $50_1$, $50_2$, these paths can be referred to as "rolling paths".

The idler wheels $50_1$-$50_{10}$ may be arranged in other configurations and/or the track system $16_i$ may comprise more or less idler wheels in other embodiments.

The frame 44 supports components of the track system $16_i$, including the idler wheels $50_1$-$50_{10}$. More particularly, in this embodiment, the front idler wheels $50_1$, $50_2$ are mounted to the frame 44 in a front longitudinal end region of the frame 44 proximate the front longitudinal end 57 of the track system $16_i$, while the rear idler wheels $50_9$, $50_{10}$ are mounted to the frame 44 in a rear longitudinal end region of the frame 44 proximate the rear longitudinal end 59 of the track system $16_i$. The roller wheels $50_3$-$50_8$ are mounted to the frame 44 in a central region of the frame 44 between the front idler wheels $50_1$, $50_2$ and the rear idler wheels $50_9$, $50_{10}$. Each of the roller wheels $50_3$-$50_8$ may be rotatably mounted directly to the frame 44 or may be rotatably mounted to a link which is pivotally mounted to the frame 44 to which is rotatably mounted an adjacent one of the roller wheels $50_3$-$50_8$, thus forming a "tandem".

The frame 44 is supported at a support area 39. More specifically, in this case, the frame 44 is supported by the axle of the ATV 10 to which is coupled the drive wheel 42, such that the support area 39 is intersected by the axis of rotation 49 of the drive wheel 42.

In this embodiment, the track system $16_i$ is movable relative to the frame 11 of the ATV 10, such as when the ATV 10 travels on uneven terrain. More particularly, the frame 44 of the track system $16_i$ is movable relative to the frame 11 of the ATV 10 to facilitate motion of the track system $16_i$ on uneven terrain and enhance its traction on the ground. The frame 44 of the track system $16_i$ is pivotable relative to the frame 11 of the ATV 10 about a pivot axis 51. More specifically, in this embodiment, the pivot axis 51 corresponds to the axis of rotation 49 of the drive wheel 42 and the frame 44 can pivot about the axle of the ATV 10 to which the drive wheel 42 is coupled. In other embodiments, the pivot axis 51 of the frame 44 may be located elsewhere (e.g., lower) than the axis of rotation 49 of the drive wheel 42.

The track system $16_i$ comprises an anti-rotation device 52 to restrict movement of the track system $16_i$ relative to the frame 11 of the ATV 10, including a pivoting movement of the track system $16_i$ relative to the frame 11 of the ATV 10. To this end, the anti-rotation device 52 is connectable between the frame 44 of the track system $16_i$ and the frame 11 of the ATV 10. In that sense, the anti-rotation device 52 may also be referred to as an anti-rotation "connector".

Figure 16:
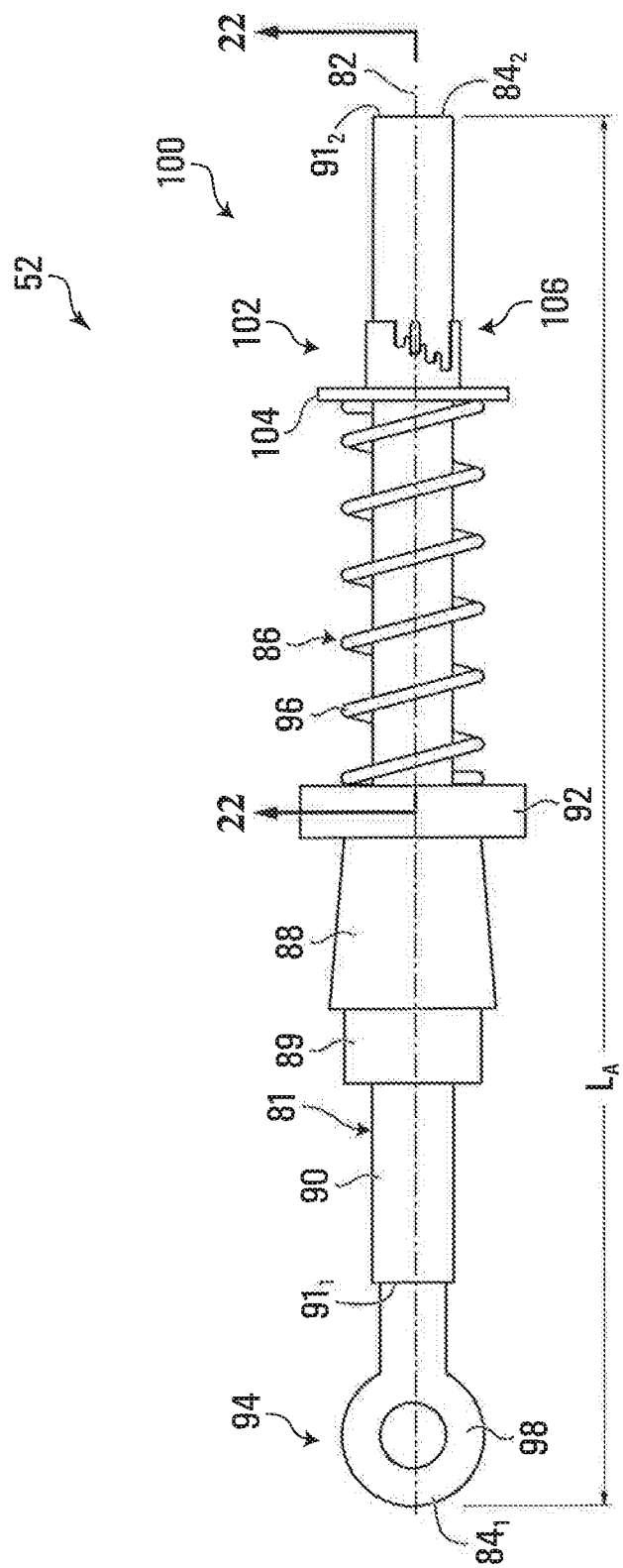
FIG. 16 shows an example of an embodiment of in which the track system comprises a control mechanism implementing a quick-adjustment mechanism for adjusting an anti-rotation device of the track system.
Figure 17:
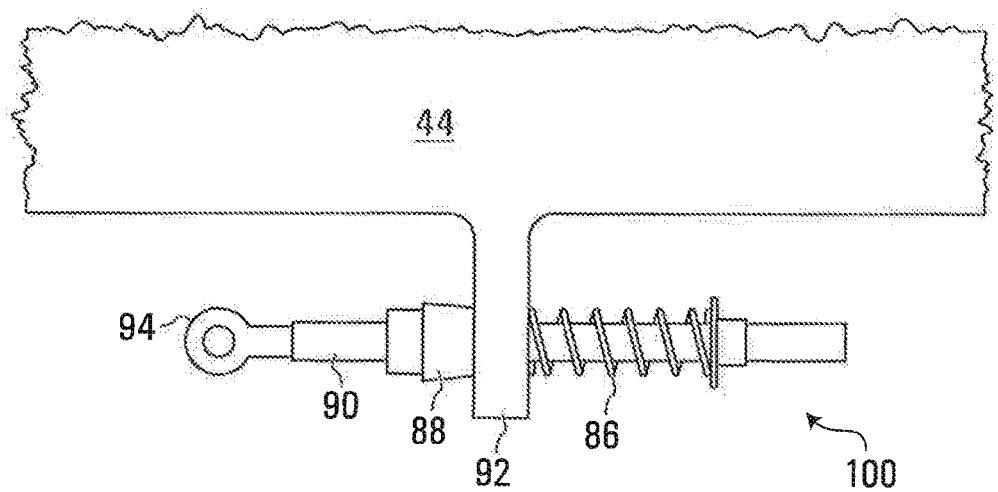
FIGS. 17 and 18 respectively show a top view of the anti-rotation device when the track system is not in pivoting motion relative to a frame of the ATV and a top view of the anti-rotation device when the track system is in a pivoting motion relative to the frame of the ATV.

The anti-rotation device 52 may be implemented in any suitable way. For example, with additional reference to FIGS. 16 and 17, in some embodiments, the anti-rotation device 52 may comprise an elongate support 81 for extending between the frame 44 of the track system 6 and the frame 11 of the ATV 10 and a resilient element 86 providing compliance to the anti-rotation device 52. The anti-rotation device 52 may also comprise a damper 88 for absorbing shocks (e.g., impacts), In this embodiment, the elongate support 81 comprises an elongate structural member 90, in this case a stabilizing rod, for supporting components of the anti-rotation device 52, a connecting part 92, in this case a mounting bracket, for mounting the anti-rotation device 52 to the frame 44 of the track system $16_i$, and a connecting part 94, in this case a coupling, for connecting the anti-rotation device 52 to the frame 11 of the ATV 10. The anti-rotation device 52 has first and second ends $84_1$, $84_2$ that define a length $L_A$ of the anti-rotation device 52. The stabilizing rod 90 supports the resilient element 86, the damper 88, the mounting bracket 92 and the coupling 94. The stabilizing rod 90 extends from a first end $91_1$ to a second end $91_2$ along a longitudinal axis 82 corresponding to a longitudinal direction of the anti-rotation device 52.

The mounting bracket 92 connects the anti-rotation device 52 to the frame 44 of the track system $16_i$. For example, in some embodiments, the mounting bracket 92 may be welded to the frame 44 or fastened to the frame 44 in any other suitable manner (e.g., via fasteners). In some embodiments, the mounting bracket 92 may be integrally made with the frame 44 of the track system $16_i$.

The coupling 94 connects the anti-rotation device 52 to the frame 11 of the ATV 10. In this embodiment, the coupling 94 comprises a rod end 98 that is fastened at the first end $91_1$ of the stabilizing rod 90 (e.g., via a threaded engagement). The rod end 98 may be connected to the frame 11 of the ATV 10 in any suitable way. For instance, in this embodiment, the rod end 98 is connected to the frame 11 of the ATV 10 via a bolt and nut connection.

The elongate support 81 may be implemented in any other suitable way in other embodiments.

Figure 18:
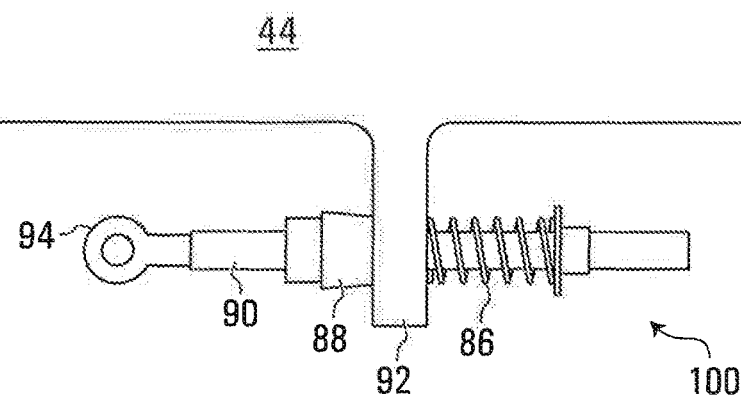

The resilient element 86 is configured to change in configuration from a first configuration to a second configuration in response to a load and recover the first configuration in response to removal of the load. This feature of the resilient element 86 provides compliance to the anti-rotation device 52 in order to restrict movement of the track system $16_i$ relative to the frame 11 of the ATV 10, including the pivoting movement of the track system $16_i$ relative to the frame 11 of the ATV 10. For instance, FIG. 18 shows the resilient element 86 change in configuration (e.g., compressed) to resist a load generated by the pivoting movement of the track system $16_i$ relative to the frame 11 of the ATV 10 (depicted by an arrow).

To that end, the resilient element 86 comprises a spring 96. The spring 96 may be a coil spring (e.g., a metallic or polymeric coil spring), an elastomeric spring (e.g., a rubber spring), a leaf spring, a fluid spring (i.e., a spring including a liquid or gas contained in a container such as a cylinder or a bellows and variably compressed by a piston or other structure, such as an air spring or other gas spring or a piston-cylinder arrangement), or any other elastic object that changes in configuration under load and recovers its initial configuration when the load is removed. In this embodiment, the spring 96 is a compression spring that is mounted concentrically to the stabilizing rod 90.

A stiffness $K_t$ of the spring 96 defines a deformation, deflection or other change in configuration of the spring 96 in response to a load. The stiffness $K_t$ of the spring 96 may in some cases be referred to as a spring rate of the spring 96. The stiffness $K_t$ of the spring 96 may have any suitable value. For instance, in some embodiments, the stiffness $K_t$ of the spring may be between 150 lb/in and 250 lb/in, in some cases between 250 lb/in and 350 lb/in, and some cases between 350 lb/in and 500 lb/in. The stiffness $K_t$ of the spring 96 may have any other suitable value in other embodiments In some cases, the spring 96 may have a preload, i.e., a distance that the spring 96 is initially deformed (i.e., compressed or extended) from its free length.

The damper 88 is configured to absorb shocks (e.g., impacts) by dissipating energy. In this embodiment, the damper 88 comprises a bushing that is concentrically mounted to the stabilizing rod 90. In this example, the bushing is conical (i.e., its peripheral surface tapers from one end of the bushing to an opposite end of the bushing), however the bushing may be cylindrical or may have any other suitable shape in other embodiments. The damper 88 comprises an elastomeric material (e.g., rubber) that allows the damper 88 to deform and subsequently regain its original configuration. This allows relative movement between components mounted at either end of the damper 88. In this embodiment, the damper 88 allows relative movement between the mounting bracket 92 and a fastening element 89 (e.g., a nut) mounted adjacent to the damper 88 on the stabilizing rod 90 (e.g., via a threaded engagement between the fastening element 89 and the stabilizing rod 90).

A stiffness $K_d$ of the damper 88 defines a deformation, deflection or other change in configuration of the damper 88 in response to a load. The stiffness $K_d$ of the damper 88 may have any suitable value. For instance, in some embodiments, the stiffness $K_d$ of the damper 88 may be between 500 lb/in and 1000 lb/in, in some cases between 1000 lb/in and 2000 lb/in, and some cases between 2000 lb/in and 3000 lb/in. The stiffness $K_d$ of the damper 88 may have any other suitable value in other embodiments.

In some cases, the damper 88 may have a preload, i.e., a distance that the damper 88 is initially compressed from its free size. For instance, in this embodiment, the preload of the damper 88 can be set by adjusting the fastening element 89. For example, the preload of the damper 88 may be increased by displacing the fastening element 89 in a direction towards the mounting bracket 92 in order to compress the damper 88 against the mounting bracket 92.

Conversely, the preload of the damper 88 may be reduced by displacing the fastening element 89 away from the mounting bracket 92.

The damper 88 may be configured differently in other embodiments. For example, as will be discussed in more detail below, in some embodiments, the damper 88 may be implemented as a viscous damper (e.g., a dashpot).

The anti-rotation device 52 can significantly affect performance of the track system $16_i$ and, therefore, performance of the ATV 10. Notably, certain parameters of the anti-rotation device 52 define how the anti-rotation device 52 operates and thus influence how the track system $16_i$ performs. For instance, in some embodiments, examples of parameters of the anti-rotation device 52 that affect the performance of the track system $16_i$ may include:

The length $L_A$ of the anti-rotation device 52. For instance, this may define a caster angle $\Theta_c$ measured between a steering axis 55 of the track system $16_i$ and a reference vertical axis. In turn, adjusting the caster angle $\Theta_c$ can affect the handling of the ATV 10.

The stiffness $K_t$ of the spring 96. For instance, this may affect the ease with which the track system $16_i$ is movable relative to the frame 11 of the ATV 10. For example, a higher stiffness $K_t$ of the spring 96 may facilitate obstacle climbing of the track system $16_i$ in rough terrain while a lower stiffness $K_t$ of the spring 96 may improve floatation of the track system $16_i$ in deep snow or soft soil. Moreover, the stiffness $K_t$ of the spring 96 may also affect the speed with which the track system $16_i$ reverts back to its original position upon moving.

The preload of the spring 96. For instance, modifying the preload of spring 96 can affect the articulation of the track system $16_i$ as well as its obstacle climbing and floatation capacity. Moreover, the preload of the spring 96 may also affect an "angle of attack" a of the track system $16_i$ which determines the manner in which the track system $16_i$ engages the ground on which the ATV 10 travels. The angle of attack a of the track system $16_i$ is an angle at which the front longitudinal end 57 of the track system $16_i$ engages the ground matter. This may affect the performance of the ATV 10, including its handling on different types of terrain for example.

The stiffness $K_d$ of the damper 88. For instance, this may affect a response time of the damper 88 in absorbing shocks to which is subjected the track system $16_i$. Moreover, the stiffness $K_d$ of the damper 88 may determine an amount of impact energy which the damper 88 can absorb and dissipate. In general, a higher stiffness $K_d$ of the damper 88 may facilitate obstacle climbing of the track system $16_i$ in rough terrain while a lower stiffness $K_d$ of the damper 88 may improve floatation of the track system $16_i$ in deep snow or soft soil.

The preload of the damper 88. For instance, this may affect the obstacle climbing and floatation capacity of the track system $16_i$. For example, a smaller preload of the damper 88 may impart better obstacle climbing and floatation capacity to the track system $16_i$ while moving in a forward direction on deep and/or powder snow. Conversely, a greater preload of the damper 88 may impart better obstacle climbing and floatation capacity to the track system $16_i$ while moving in reverse (i.e., in a direction opposite to the forward direction) in deep and/or powder snow.

In this embodiment, the track system $16_i$ is configured to facilitate adjustment of the anti-rotation device 52 to tune the performance of the track system $16_i$ and thus the performance of the ATV 10, with minimal or no input required from the user of the ATV 10.

Figure 19:
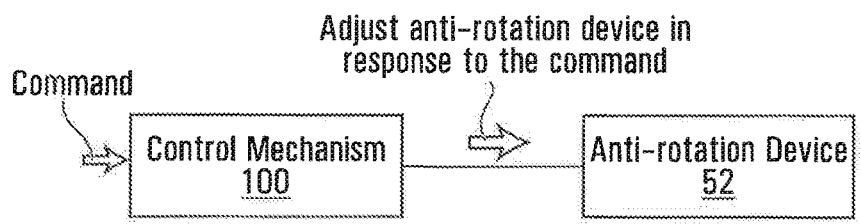
FIG. 19 shows a flow diagram depicting an adjustment command inputted by a user to the control mechanism in order to adjust the anti-rotation device.

To that end, with additional reference to FIG. 19, the track system $16_i$ comprises a control mechanism 100 configured to adjust the anti-rotation device 52 (i.e., adjust at least one parameter of the anti-rotation device 52) in accordance with one or more factors, such as, for example, the user's preferences (e.g., riding style, desire to "feel" the ground, etc.), the environment of the track system $16_i$ (e.g., the profile of the ground, such as the slope or steepness or the levelness of the ground, the compliance of the ground, such as the softness or hardness of the ground, etc.), the state of the track system $16_i$ (e.g., the speed and/or the direction of motion of the track 41 around the track-engaging assembly 17, etc.), the state of the ATV 10 (e.g., the speed and/or direction of the ATV 10, etc.), and/or any other suitable factor.

In this embodiment, the control mechanism 100 is configured to adjust the anti-rotation device 52 toollessly, i.e., without use of any tool (e.g., wrench, screwdriver, etc.) separate from and external to the track system $16_i$ that has to be mechanically engaged with the anti-rotation device 52. This is in contrast with a conventional track system which requires an individual to use a tool such as a wrench, screwdriver, etc. to mechanically engage the conventional track system's anti-rotation device in order to adjust it.

More particularly, in this embodiment, the control mechanism 100 is configured to adjust the anti-rotation device 52 in response to a command. This command, which may be referred to as an "adjustment command", is provided toollessly (i.e., without use of any tool separate from and external to the track system $16_i$ that has to be mechanically engaged with the anti-rotation device 52). As further discussed later, in some embodiments, the adjustment command may be provided by the user of the ATV 10, whereas, in other embodiments, the adjustment command may be generated automatically.

The control mechanism 100 may be implemented in various ways, examples of which will be described below.

I. Adjusting the Anti-Rotation Device Through Minimal User Input

Figure 20:
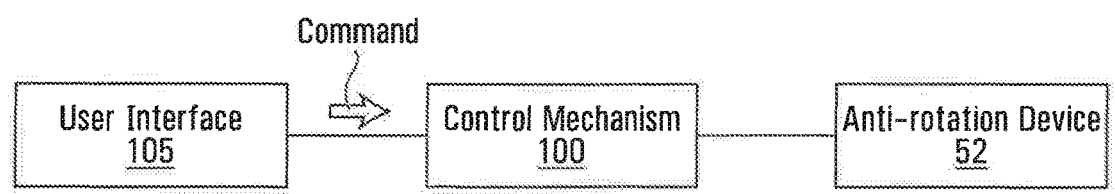
FIG. 20 shows a flow diagram depicting a user interface of the control mechanism with which the user interacts to input the adjustment command.
Figure 21:
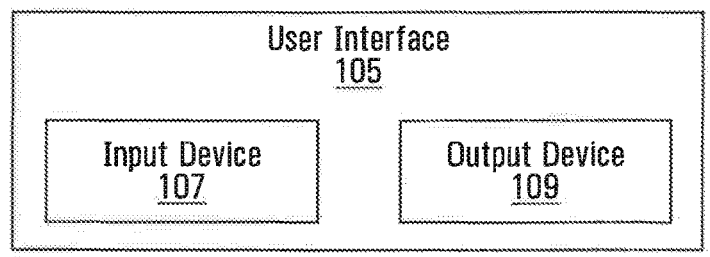
FIG. 21 shows the user interface of the control mechanism.
Figure 22:
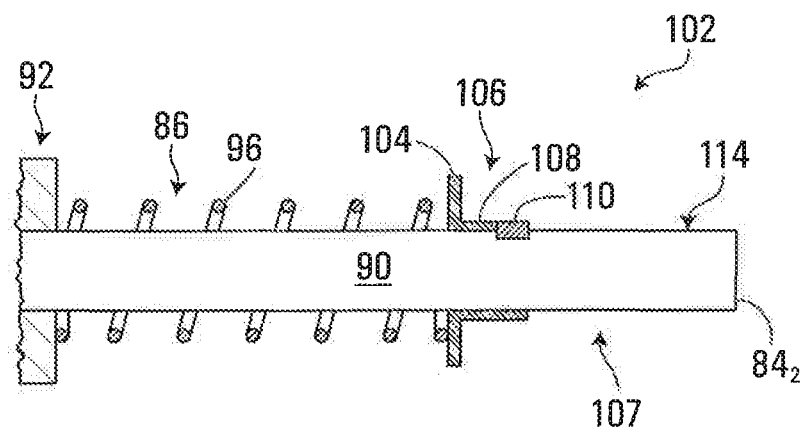
FIG. 22 shows a detail cross-sectional view of the quick-adjustment mechanism taken along line 22-22 of FIG. 16.

In some embodiments, as shown in FIGS. 19 to 21, the control mechanism 100 for adjusting the anti-rotation device 52 may be manually operated to allow adjustment of the anti-rotation device 52 through minimal user input. In other words, the control mechanism 100 may facilitate a manual adjustment of the anti-rotation device 52. To that end, the adjustment command is inputtable by the user of the ATV 10 via a user interface 105 configured to allow the user to adjust the anti-rotation device 52. In this embodiment, the control mechanism 100 comprises the user interface 105.

For example, in this embodiment, with the user interface 105, the control mechanism 100 for the anti-rotation device 52 may comprise a quick-adjustment mechanism 102 for operation by the user of the ATV 10 to adjust the anti-rotation device 52.

As shown in FIG. 21, the user interface 105 comprises an input device 107 that the user can act upon to adjust the anti-rotation device 52. The input device 107 may be implemented in any suitable way. For example, in some embodiments, the input device 107 may comprise a mechanical input element, such as a lever, a switch, a button, a dial, a knob, a manual screw, a clamp, or any other physical element that the user can act upon to adjust the anti-rotation device 52. In other embodiments, the input device 107 may comprise a virtual input element, such as a virtual button or other virtual control, of a graphical user interface (GUI) displayed on a screen.

The user interface 105 may also comprise an output device 109 that can convey information about the anti-rotation device 52 to the user in order to facilitate the adjustment of the anti-rotation device 52. For example, in some embodiments, the output device 109 may comprise a display for displaying information to the user of the ATV 10. For instance, the display may be configured to display the length $L_A$ of the anti-rotation device 52, the stiffness $K_t$ of the spring 96, the stiffness $K_d$ of the damper 88, the preload of the spring 96, the preload of the damper 88, or any other parameter related to the anti-rotation device 52.

When the user acts upon the input device 107 of the user interface 105, the adjustment command is conveyed to the control mechanism 100 to adjust the anti-rotation device 52. The control mechanism 100 comprises an actuator 111 for adjusting the anti-rotation device 52 based on the adjustment command.

In this embodiment, as will be described in more detail below, the actuator 111 comprises a mechanical actuator that converts rotary motion into linear motion. The actuator 111 may comprise other types of actuators in other embodiments. For instance, as shown in FIGS. 30 and 31, in some embodiments, the actuator 111 may comprise an electromechanical actuator (e.g., a linear actuator) or a fluidic actuator (e.g., a hydraulic or pneumatic actuator).

In some embodiments, the adjustment command may be conveyed as a mechanical action. For instance, the adjustment command may constitute a mechanical motion that is transmitted via the actuator 111 of the control mechanism 100. In some cases, the adjustment command may be conveyed via a linkage or any other mechanical transmission.

In other embodiments, the adjustment command may be conveyed as a signal. For instance, the adjustment command may be conveyed as an electrical signal configured to be received by an electromechanical actuator.

In this embodiment, the input device 107 and the actuator 111 are comprised by the quick-adjustment mechanism 102 such that the quick-adjustment mechanism 102 is operable to adjust the anti-rotation device 52 in response to the adjustment command. For instance, in this embodiment, the quick-adjustment mechanism 102 is operable to adjust the preload of the spring 96. With additional reference to FIG. 22, in this embodiment, the input device 107 comprises a portion of the stabilizing rod 90 configured to be acted upon by the adjustment command of the user while the actuator 111 comprises a cam mechanism 106 that effects an adjustment of the preload of the spring 96 based on the adjustment command that the user transmits to the stabilizing rod 90.

To that end, the quick-adjustment mechanism 102 also comprises a support bushing 104 that is selectively moveable by the cam mechanism 106 along the longitudinal direction of the anti-rotation device 52. More particularly, the support bushing 104 is slidably mounted onto the stabilizing rod 90 of the anti-rotation device 52 and is positioned to abut a first end $97_1$ of the spring 96. A second end $97_2$ of the spring 96 is abutted by the mounting bracket 92 which is fixed to the frame 44 of the track system $16_i$. As such, the support bushing 104 is operable to compress the spring 96 in accordance to its position along the longitudinal direction of the anti-rotation device 52. More particularly, the spring 96 is increasingly compressed as the support bushing 104 is moved towards the mounting bracket 92. Thus, as will be appreciated, the position of the support bushing 104 along the longitudinal direction of the anti-rotation device 52 determines the preload of the spring 96.

The cam mechanism 106 comprises a cam guide member 108 and a cam follower 110 configured to interact with the cam guide member 108. Although in this embodiment, the cam guide member 108 is integral to the support bushing 104, in other embodiments, the cam guide member 108 may be connected to (e.g., fastened to) the support bushing 104 rather than being integrally made with the support bushing 104.

The cam follower 110 limits the extension of the spring 96 by impeding the support bushing 104 from freely moving away from the mounting bracket 92 (i.e., towards the second end $84_2$ of the anti-rotation device 52) in response to a load exerted by the spring 96 on the support bushing 104. In this embodiment, the cam follower 110 has a rounded rectangular shape and fits into a groove of the stabilizing rod 90 to which it is fixed in any suitable way (e.g., by a fastener or welding). When mounted to the stabilizing rod 90, the cam follower 110 protrudes from a peripheral surface of the stabilizing rod 90 such that the cam guide member 108 engages the cam follower 110. The cam follower 110 may have any other suitable shape in other embodiments.

In this embodiment, the cam guide member 108 enables a discrete adjustment of the support bushing 104. In other words, the cam guide member 108 allows the support bushing 104 to occupy a finite number of positions along the longitudinal direction of the anti-rotation device 52. More particularly, the cam guide member 108 comprises a plurality of steps $112_1$-$112_S$ for receiving the cam follower 110, each step $112_i$ of the plurality of steps $112_1$-$112_S$ being associated with a position of the support bushing 104 along the longitudinal direction of the anti-rotation device 52. Consequently, each step $112_i$ of the plurality of steps $112_1$-$112_S$ is associated with a predetermined preload value of the spring 96. Also, the step $112_i$ may be configured to securely receive the cam follower 110 such as to prevent the cam follower 110 from accidentally disengaging the step $112_i$. For instance, in this embodiment, the step $112_i$ has a shape that is complementary to the shape of the cam follower 110 (e.g., a matching curved surface).

Thus, in this embodiment, the adjustment command consists of the user effecting a rotation of the stabilizing rod 90 to align the cam follower 110 with the step $112_i$ of the cam guide member 108 associated with a desired preload of the spring 96. The desired preload of the spring 96 can be determined by various factors. For instance, the desired preload of the spring 96 can be determined by the user's preference of a "feel" of the handling of the ATV 10. The desired preload of the spring 96 may alternatively or additionally be determined by the riding conditions. For instance, the desired preload of the spring 96 may vary when the ATV 10 travels on light snow compared to when the ATV 10 travels on mud.

In some embodiments, the stabilizing rod 90 may comprise a grip portion 114 to facilitate the user's handling of the stabilizing rod 90. For instance, the grip portion 114 may comprise a knurled texture, a set of protrusions and/or recesses, a handle, or any other suitable configuration to facilitate handling by the user.

As will be appreciated, the quick-adjustment mechanism 102 and its actuator 111 allows the user of the ATV 10 to manually adjust the preload of the spring 96 of the anti-rotation device 52 toollessly. That is, adjusting the preload of the spring 96 via the quick-adjustment mechanism 102 does not require any tools (e.g., a wrench, a screwdriver, etc.). Moreover, since the quick-adjustment mechanism 102 offers a finite number of preload settings to the spring 96, the user may spend less time fine tuning the preload of the spring 96 than if a continuous adjustment of the support bushing 104 were implemented.

Figure 23:
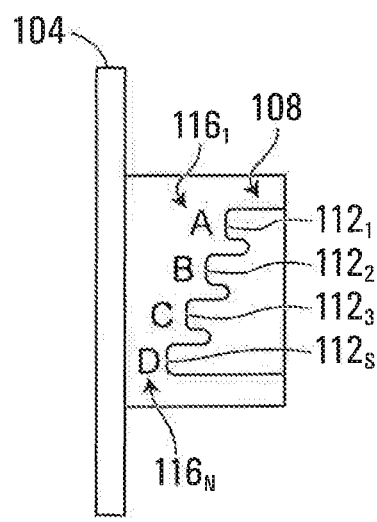
FIG. 23 shows an example of an embodiment of a support bushing of the quick-adjustment mechanism.

In some embodiments, the quick adjustment mechanism 102 may be configured to facilitate an association between a preload setting of the spring 96 and a given condition. For instance, in some embodiments, as shown in FIG. 23, the support bushing 104 of the quick adjustment mechanism 102 may comprise a plurality of labels $116_1$-$116_N$ adjacent the plurality of steps $112_1$-$112_S$ such that each label $116_i$ is associated with a given step $112_i$. Each label $116_i$ is indicative of a given condition and/or a setting. For example, a label $116_i$ may be an image, a word, a letter and/or a color representing an environment condition (e.g., mud, snow, rain, etc.) and/or a setting (e.g., 2% preload, 5% preload, etc.).

The quick-adjustment mechanism 102 may be implemented differently in other embodiments.

Figure 24:
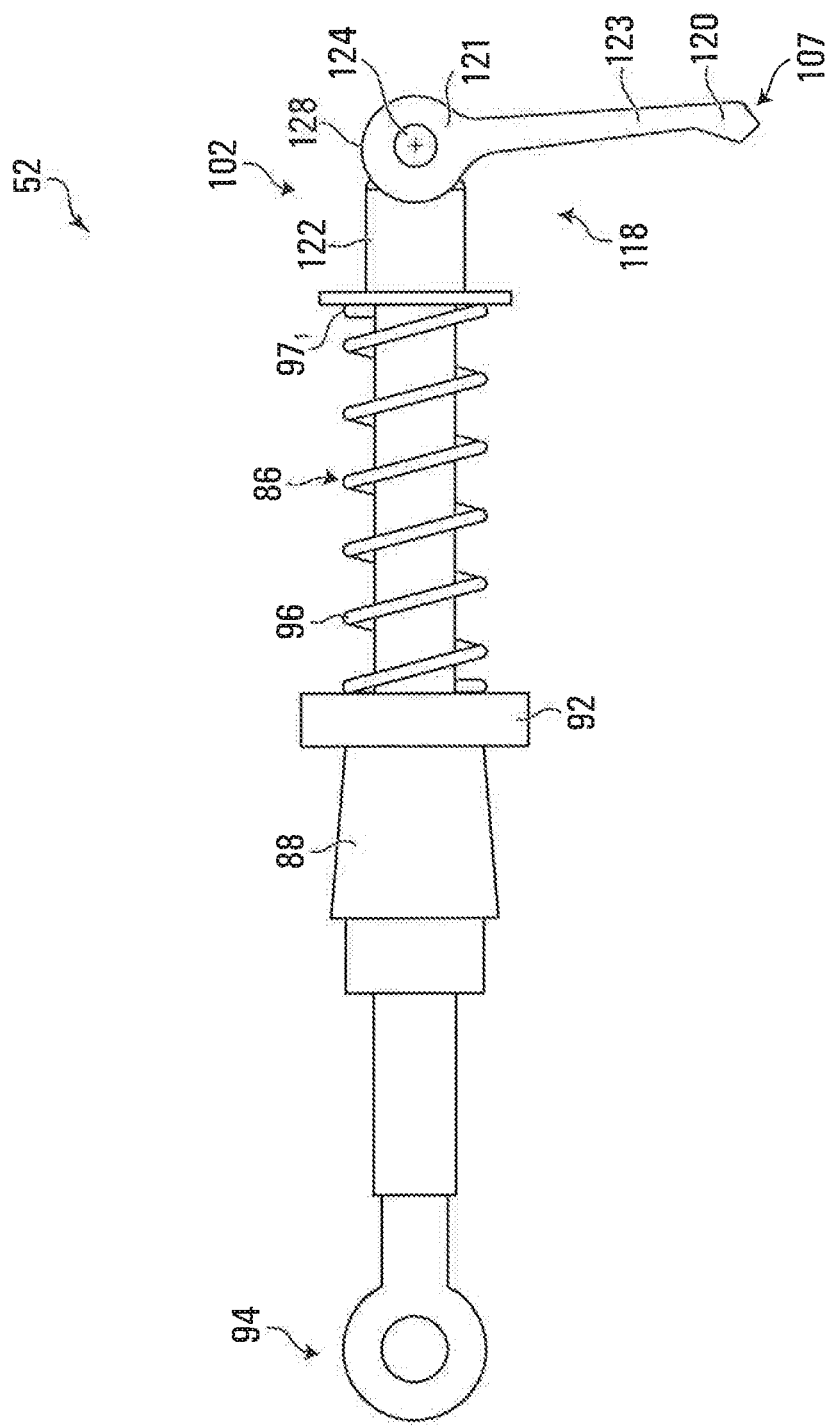
FIG. 24 shows another embodiment of the quick-adjustment mechanism of the anti-rotation device in which the quick-adjustment mechanism comprises a cam lever assembly.
Figure 25:
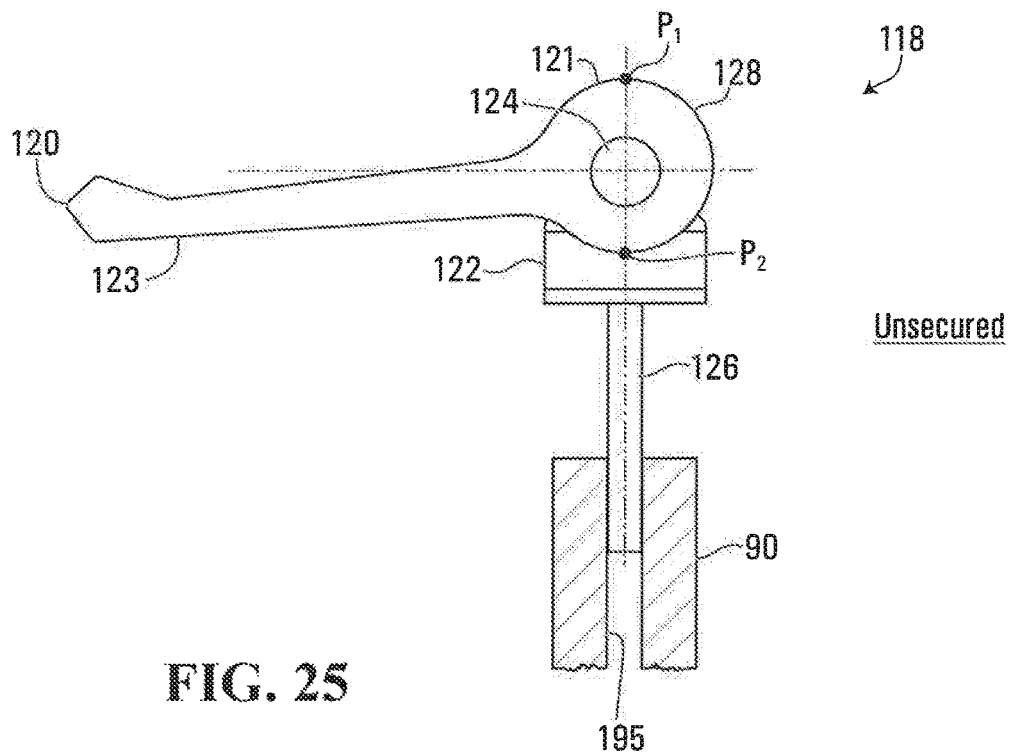
FIGS. 25 and 26 respectively show the cam lever assembly in an unsecured and a secured state.
Figure 26:
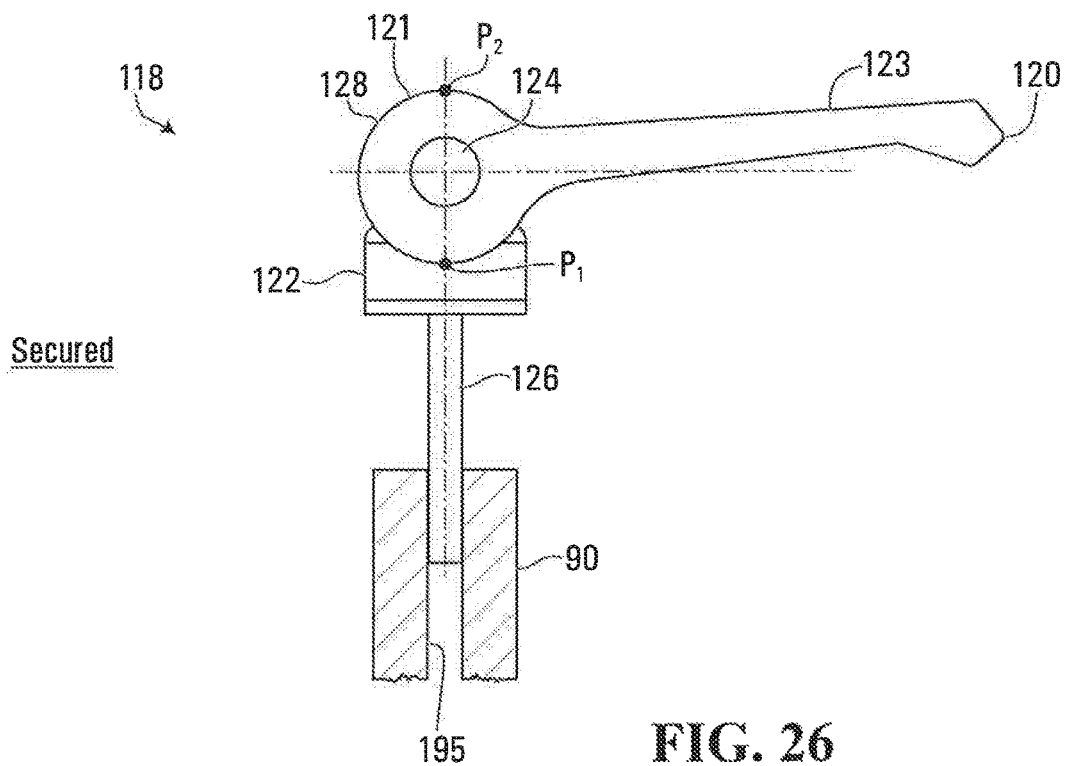

For instance, in another embodiment, with additional reference to FIGS. 24 to 26, the quick-adjustment mechanism 102 comprises a cam lever assembly 118 for adjusting the preload of the spring 96 of the anti-rotation device 52. In this embodiment, the input device 107 comprises a lever 120 of the cam lever assembly 118 which can be acted upon by the adjustment command of the user. For its part, the actuator 111 comprises a stud 126 of the cam lever assembly 118 which effects an adjustment of the preload of the spring 96 in response to the adjustment command effected by the user at the lever 120. The cam lever assembly 118 further comprises a base 122 for supporting the lever 120, a retention member (not shown) connecting the lever 120 and the base 122, and a rotating pin 124 about which the lever 120 is rotatable.

The stud 126 connects the cam lever assembly 118 to the anti-rotation device 52. More specifically, the stud 126 is a threaded stud that threadedly engages the stabilizing rod 90 of the anti-rotation device 52 while also threadedly engaging the rotating pin 124 of the cam lever assembly 118. In this embodiment, the stabilizing rod 90 comprises a threaded hole 195 at its second end $91_2$ for engaging the stud 196.

The base 122 abuts the first end $97_1$ of the spring 96. As such, displacing the base 122 along the longitudinal direction of the anti-rotation device 52 changes the preload of the spring 96. More precisely, fastening the stud 126 with the stabilizing rod 90 displaces the base 122 towards the mounting bracket 92 thus increasing the preload of the spring 96. Conversely, unfastening the stud 126 from the stabilizing rod 90 displaces the base 122 away from the mounting bracket 92 thus decreasing the preload of the spring 96.

As will be explained in more detail below, the lever 120 enables the user to selectively secure and unsecure the cam lever assembly 118. The lever 120 comprises a support portion 121 and an arm portion 123. The support portion 121 of the lever 120 is generally cylindrical, having a circular periphery 128, and comprises an opening for receiving the rotating pin 124. The opening of the support portion 121 is eccentric to the periphery 128 such that the rotating pin 124 is positioned eccentrically relative to the support portion 121. For instance, a point $P_1$ of the circular periphery 128 is a furthest point of the periphery 128 to the center of the rotating pin 124. Conversely a point $P_2$ of the circular periphery 128, diametrically opposite of the point $P_1$, is a closest point of the periphery 128 to the center of the rotating pin 124. The arm portion 123 of the lever 120 facilitates a rotation of the lever 120 about the rotating pin 124 by providing a mechanical advantage to the user.

As shown in FIG. 25, when the lever 120 is positioned such that the point $P_2$ of the circular periphery 128 (i.e., the closest point of the periphery 128 to the center of the rotating pin 124) faces the base 122, the cam lever assembly 118 is in an unsecured state. That is, the stud 126 of the cam lever assembly 118 can be freely fastened and unfastened from engagement with the stabilizing rod 90 which causes the preload of the spring 96 to vary accordingly.

As shown in FIG. 26, the lever 120 can be rotated about the rotating pin 124 such that the point $P_1$ of the circular periphery 128 (i.e., the furthest point of the periphery 128 from the center of the rotating pin 124) faces the base 122. The increased distance between the center of the rotating pin 124 and the base 122 generates a clamping force caused by a small shift of the base 122 towards the mounting bracket 92. In this position of the lever 120, the cam lever assembly 118 is in a secured state. That is, the stud 196 cannot be fastened or unfastened from its engagement with the stabilizing rod 90.

Thus, in this embodiment, the adjustment command provided by the user to increase the preload of the spring 96 consists in unsecuring the cam lever assembly 118 by rotating the lever 120 about the rotating pin 124 to a position where the point $P_2$ is adjacent to the base 122. The user then fastens the stud 196 further into the threaded hole 195 of the stabilizing rod 90. This drives the base 122 closer to the mounting bracket 92 and thus compresses the spring 96 to increase its preload. Once the spring 96 has the desired preload, the user secures the cam lever assembly 118 by rotating the lever 120 about the rotating pin 124 such that the point $P_1$ is adjacent to the base 121.

Conversely, the adjustment command provided by the user to decrease the preload of the spring 96 consists in unsecuring the cam lever assembly 118 by rotating the lever 120 about the rotating pin 124 to a position where the point $P_2$ is adjacent to the base 122. The user then unfastens the stud 196 from the threaded hole 195 of the stabilizer rod 90 by a desired amount. This drives the base 122 away from the mounting bracket 92 and thus decreases the preload of the spring 96 as it extends to abut the base 122 of the cam lever assembly 118. Once the spring 96 has the desired preload, the user secures the cam lever assembly 118 by rotating the lever 120 about the rotating pin 124 such that the point $P_1$ is adjacent to the base 121.

Other parameters of the anti-rotation device 52 may also be adjusted in response to the adjustment command.

For instance, in some embodiments, the adjustment command may cause the length $L_A$ of the anti-rotation device 52 to be adjusted. For example, the threaded engagement between the rod end 98 and the stabilizing rod 90 may be selectively increased or decreased based on the adjustment command.

Figure 42:
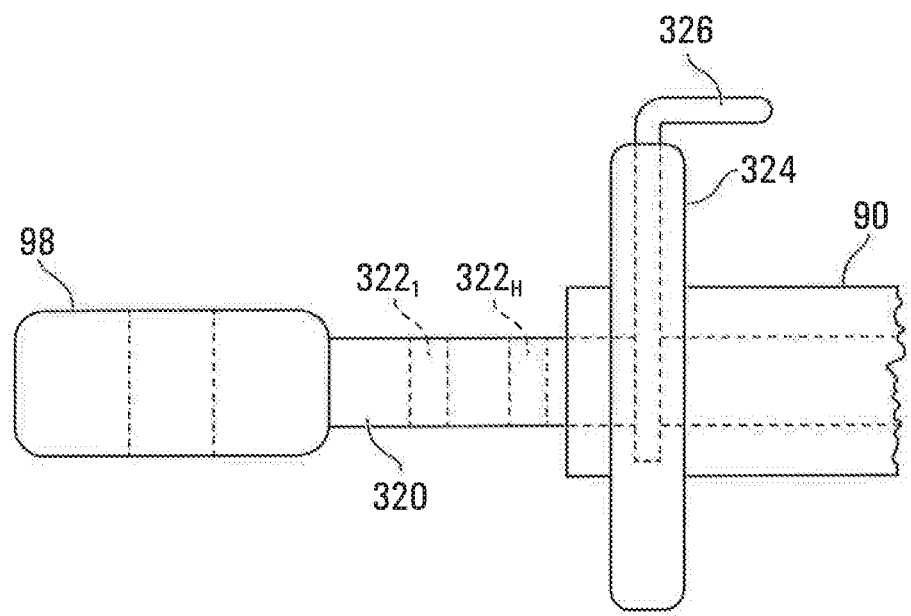
FIGS. 42 and 43 show an example of an embodiment in which a length of the anti-rotation device is slidably adjusted by a corresponding adjustment command.
Figure 43:
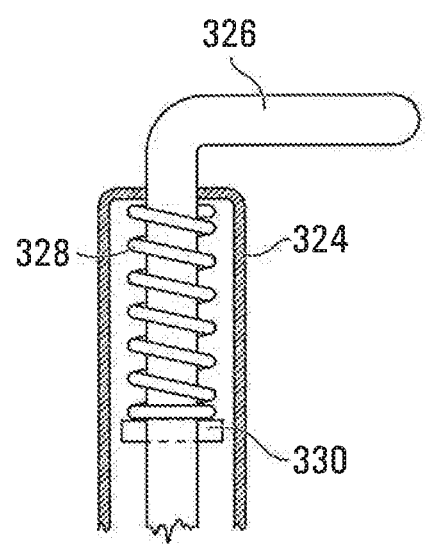

The engagement between the rod end 98 and the stabilizing rod 90 may be configured differently in other embodiments. For instance, in some embodiments, the rod end 98 may be slidably movable relative to the stabilizing rod 90. For example, as shown in FIG. 42, the rod end 98 may comprise a rod portion 320 that is slidable within an opening at the first end $91_1$ of the stabilizing rod 90 and comprises a plurality of openings $322_1$-$322_H$ distributed along a length of the rod portion 320. In order to secure the rod end 98 at a given position relative to the stabilizing rod 90, a collar 324 is secured to the stabilizing rod 90 (e.g., via one or more set screws) and supports a pin 326 that engages a selected one of the openings $322_1$-$322_H$ of the rod portion 320 of the rod end 98. More specifically, in this example, as shown in FIG. 43, the pin 326 is spring-loaded and is L-shaped in order to facilitate grasping of the pin 326 by the user. The pin 326 is spring-loaded in that a spring 328 surrounds a portion of the pin 328 and is abutted by the collar 324 at one end and by an abutment element 330 (e.g., a cotter pin) in engagement with the pin 326 on the other end. As such, when the pin 326 is retracted, the spring 328 forces the pin 326 towards the rod portion 320 of the rod end 98. This may allow the user to quickly and toollesly adjust the engagement between the rod end 98 and the stabilizing rod 90 by (1) disengaging the pin 326 from the rod end 98 (by lifting the pin 326); (2) aligning a selected opening $322_i$ of the rod portion 320 of the rod end 98 with the pin 326 and (3) releasing the pin 326 such that it engages the selected opening $322_i$. As such, in this example, the length $L_A$ of the anti-rotation device 52 can be adjusted to have any one of a number of pre-determined values established by the openings $322_1$-$322_H$ of the rod end 98.

In some embodiments, the adjustment command may cause the preload of the damper 88 to be adjusted. For instance, the fastening element 89 may be replaced with a mechanism similar to the cam lever assembly 118 described above thus allowing for rapid modification of the preload of the damper 88.

In some embodiments, the stiffness $K_t$ of the spring 96 may be adjusted without an adjustment command. For example, the spring 96 may be a multi-rate spring having two or more spring rates (i.e., spring stiffnesses). Such multi-rate springs have a variable pitch (i.e., a variable spacing between adjacent spring coils) such that initial compression of the spring 96 is met with a smaller resistance (i.e., a smaller stiffness) as the more widely-spaced adjacent coils compress. A greater resistance (i.e., a greater stiffness) is then met as the adjacent coils that are closest to one another are activated in response to the compression of the spring 96. In such cases, the stiffness $K_t$ of the spring 96 is thus adjusted without any input from the sensor 152.

In some embodiments, the stiffness $K_d$ of the damper 88 may be adjusted based on one or more parameters relating to the track system $16_i$ and/or the ATV 10. In some cases, the stiffness $K_d$ of the damper 88 may be adjusted without an adjustment command. For instance, in cases where the damper 88 is a viscous damper, a damping force associated with the damping action of the damper 88 varies according to the speed of the pivoting movement of the track system $16_i$ relative to the frame 11 of the ATV 10.

In other embodiments where the damper 88 comprises an elastomeric material (e.g., rubber), the stiffness $K_d$ of the damper 88 may also be adjusted without an adjustment command. For instance, the damper 88 may be configured such that it comprises two or more stiffness values along its longitudinal direction such that the stiffness $K_d$ of the damper 88 is variable along the longitudinal direction of the damper 88. For instance, in some cases, the stiffness $K_d$ of the damper 88 may be such that it forms a stiffness gradient along its longitudinal direction (i.e., the stiffness $K_d$ of the damper 88 increases or decreases in the longitudinal direction of the damper 88). To that end, in some embodiments, the damper 88 may comprise two or more elastomeric materials arranged along its longitudinal direction and having different stiffness values (e.g., $K_{d1}$ and $K_{d2}$, where $K_{d1}>K_{d2}$).

In a variant, the user interface 105 may be a part of the ATV 10 rather than the track system $16_i$. For instance, the user interface 105 may be a part of the user interface 20 of the ATV 10 (e.g., a part of the instrument panel of the ATV 10). For example, in some cases, the input device 107 of the user interface 105 may comprise a switch on the instrument panel of the ATV 10 that can be actuated by the user to transmit an adjustment command to the actuator 111 which adjusts the anti-rotation device 52. In such cases, the actuator 111 may not be a purely mechanical actuator but rather an electromechanical actuator or a fluidic actuator that is configured to receive the adjustment command provided as a signal (i.e., an electrical signal).

Figure 27:
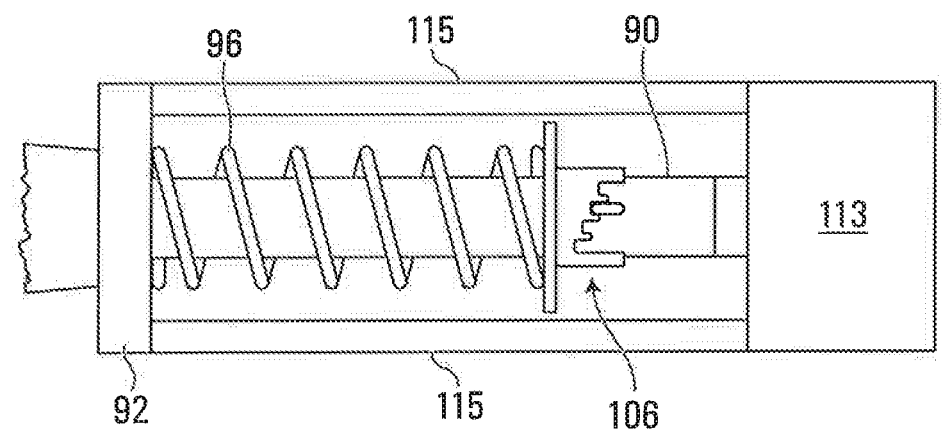
FIG. 27 shows an example of an embodiment in which the anti-rotation device is adjusted by an actuator.

More particularly, with additional reference to FIG. 27, the actuator 111 of the quick-adjustment mechanism 102 may comprise a rotary actuator 113 (e.g., a servomotor, a stepper motor, etc.) to rotate the stabilizing rod 90 such that the cam mechanism 106 is actuated to modify the preload of the spring 96 as was described above. In this example, a plurality of support members 115 connects the rotary actuator 113 to the mounting bracket 92.

Figure 28:
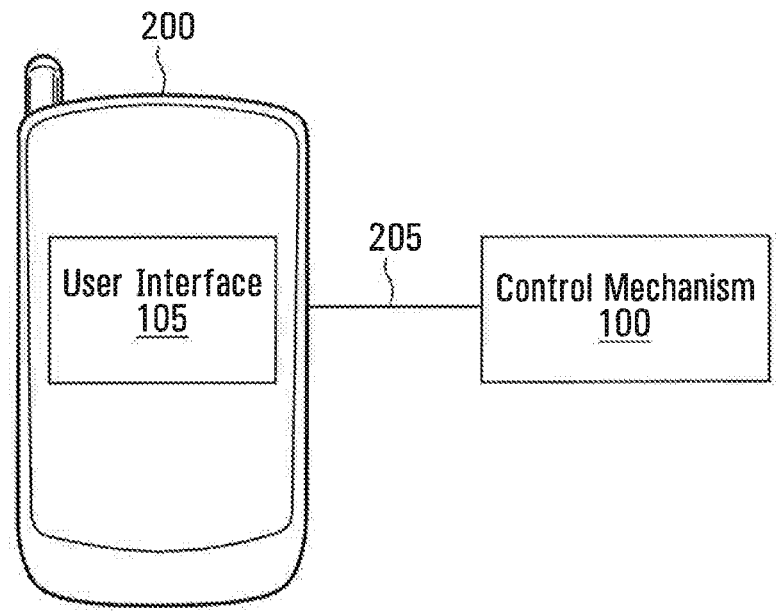
FIG. 28 shows a variant in which the user interface is part of a communication device external to the ATV.
Figure 29:
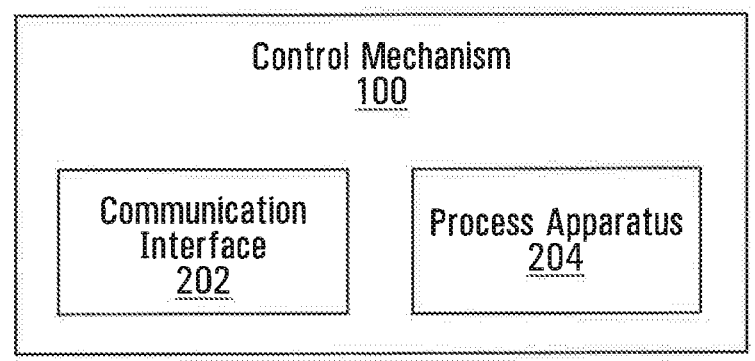
FIG. 29 shows the control mechanism of FIG. 28.

In another variant, as shown in FIGS. 28 and 29, the user interface 105 may be implemented by an application running on a communication device 200 that is linked to the control mechanism 100 via a connection a 205. In such a variant, the control mechanism 100 comprises a communication interface 202 to establish communication with the communication device 200 and a processing apparatus 204 to receive and process the adjustment command provided by the user via the communication device 200. Examples of embodiments of the communication device 200 include but are not limited to a smartphone, a personal digital assistant (PDA), a tablet, a smart watch, a computer, or any other suitable communication device.

The communication interface 202 of the control mechanism 100 enables establishment of the connection 205 between the control mechanism 100 and the communication device 200. For example, the communication interface 202 may enable a wireless communication such that the connection 205 between the control mechanism 100 and the communication device 200 is a wireless connection. For example, the connection 205 between the control mechanism 100 and the communication device 200 may be a Bluetooth® connection. In some cases, the connection 205 between the control mechanism 100 and the communication device 200 may be a connection established wirelessly over the Internet. In some embodiments, the connection 205 between the control mechanism 100 and the communication device 200 may be a wired connection (e.g., via a USB cable). The connection 205 may be established in any other suitable way in other embodiments.

Thus, in this variant, the user wishing to adjust the anti-rotation device 52 may interact with the communication device 200. More specifically, the user interacts with the input device 107 of the user interface 105 (e.g., an app) to transmit the adjustment command to the control mechanism 100 via the connection 205. The control mechanism 100 then adjusts the anti-rotation device 52 via the actuator 111. This may allow the user to adjust the anti-rotation device 52 remotely from the ATV 10. That is, the user may not need to interact directly with the ATV 10 or the track system $16_i$ to adjust the anti-rotation device 52.

II. Adjusting the Anti-Rotation Device Automatically

In some embodiments, as shown in FIG. 32, the control mechanism 100 for adjusting the anti-rotation device 52 may enable an automatic adjustment of the anti-rotation device 52, i.e., adjustment of the anti-rotation device 52 without user input. To that end, the adjustment command is automatically generated by a controller 250. In this embodiment, the control mechanism 100 comprises the controller 250.

Figure 33:
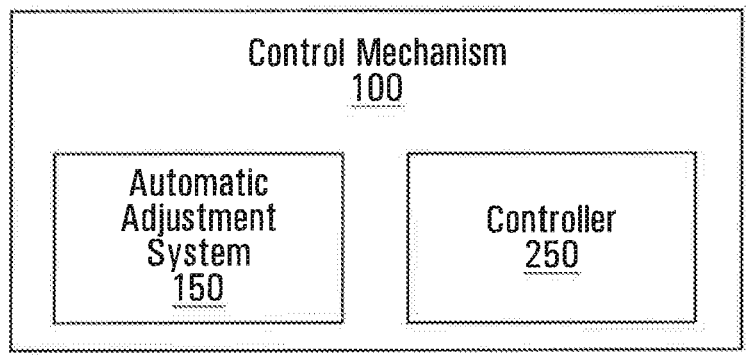
FIG. 33 shows an example of an embodiment in which the control mechanism comprises the controller and an automatic adjustment system for automatically adjusting the anti-rotation device.

For instance, in this embodiment, as shown in FIG. 33, with the controller 250, the control mechanism 100 may comprise an automatic adjustment mechanism 150 configured to automatically adjust the anti-rotation device 52.

The automatic adjustment of the anti-rotation device 52 may be effected based on information regarding the track system $16_i$. For example, in some embodiments, the information regarding the track system $16_i$ may include:

information regarding the state of the track system $16_i$, such as, for instance, the speed of motion of the track 41 around the track-engaging assembly 17, the direction of motion of the track 41 around the track-engaging assembly 17, a tension of the track 41, and/or any other parameter that pertains to the state of the track system $16_i$;

information regarding the state of the ATV 10 to which the track system $16_i$ is mounted, such as, for instance, the speed of the ATV 10, the direction of motion of the ATV 10 (e.g., forward or reverse), a parameter of the powertrain 13 of the ATV 10 (e.g., a speed of the prime mover 12, a ratio of the transmission, etc.), and/or any other parameter that pertains to the state of the ATV 10;

information regarding the environment of the track system $16_i$, such as, for example, the profile (e.g., the slope or steepness or the levelness) of the ground beneath the track system $16_i$, the compliance (e.g., softness or hardness) of the ground beneath the track system $16_i$, and/or any other parameter that pertains to the environment of the track system $16_i$; and/or any other parameter relating to the track system $16_i$.

Figure 34:
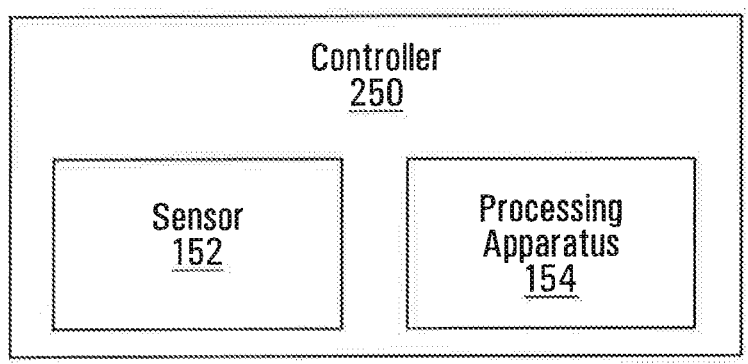
FIG. 34 shows an example of an embodiment of the controller of the control mechanism, including a sensor and a processing apparatus.

In this embodiment, as shown in FIG. 34, the controller 250 for the automatic adjustment system 150 comprises a sensor 152 configured to sense one or more parameters relating to the track system $16_i$ and a processing apparatus 154 configured to convey the adjustment command to adjust the anti-rotation device 52 based on these one or more parameters relating to the track system $16_i$. The control mechanism 100 comprises an actuator 156 for adjusting the anti-rotation device 52 based on the adjustment command from the processing apparatus 154.

The sensor 152 is configured to sense one or more parameters relating to the track system $16_i$. For instance, as discussed above, examples of one or more parameters relating to the track system $16_i$ that can be sensed by the sensor 152 include:

the speed of motion of the track 41 around the track-engaging assembly 17;

the direction of motion of the track 41 around the track-engaging assembly 17;

the tension of the track 41;

the profile of the ground beneath the track system $16_i$; and/or the compliance of the ground beneath the track system $16_i$.

Figure 35:
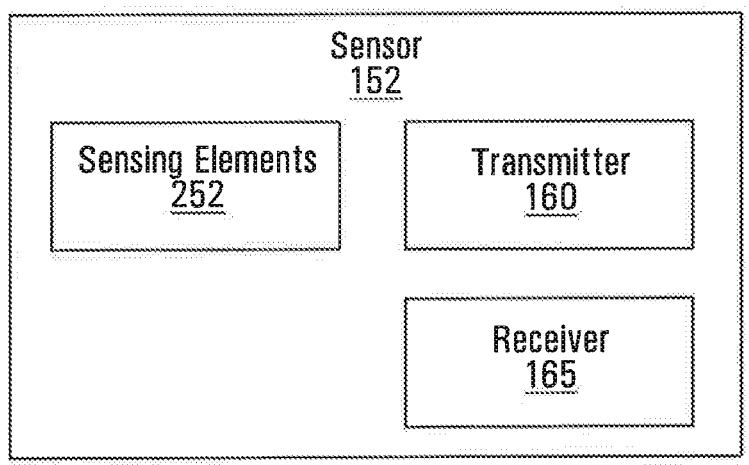
FIG. 35 shows an example of an embodiment of the sensor of the controller.

To that end, as shown in FIG. 35, the sensor 152 may comprise one or more sensing elements 252 to sense these one or more parameters relating to the track system $16_i$. For example, in some embodiments:

to sense the speed of motion of the track 41 around the track-engaging assembly 17, a sensing element 252 may be a tachometer (e.g., a wheel speed sensor) configured to sense a rotational speed of the drive wheel 42;

to sense the direction of motion of the track 41, a sensing element 252 may also be an accelerometer (e.g., a G-sensor);

to sense the tension of the track 41, a sensing element 252 may be a pressure sensor configured to sense the pressure exerted on the leading idler wheels $50_1$, $50_2$ and the trailing idler wheels $50_9$, $50_{10}$;

to sense the profile of the ground beneath the track system, a sensing element 252 may be a gyroscope; and to sense the compliance of the ground beneath the track system $16_i$, a sensing element 252 may be a laser sensor or an ultrasound sensor.

In some embodiments, the sensor 152 may include sensor elements that are integral to the ATV 10. That is, the sensor 152 may include sensor elements that are standard sensor elements installed on the ATV 10 by its manufacturer. For example, the sensor 152 may include a speedometer of the ATV 10, a transmission state sensor of the ATV 10, and/or any other suitable sensor element of the ATV 10.

The sensor 152 is configured to communicate the parameter(s) it senses to the processing apparatus 154 via a link 254. To that end, the sensor 152 comprises a transmitter 160 for transmitting the parameter(s) relating to the track system 16$_i$ to the processing apparatus 154, which comprises a receiver 162 to receive the sensor signal from the sensor 152.

The transmitter 160 of the sensor 152 and the receiver 162 of the processing apparatus 154 may establish the link 254 between one another in any suitable way. In this embodiment, the link 254 is a wireless link such that the sensor 152 and the processing apparatus 154 are connected wirelessly. Thus, in this embodiment, the transmitter 160 of the sensor 152 is a wireless transmitter that can wirelessly transmit the sensor signal and the receiver 162 of the processing apparatus 154 is a wireless receiver that can wirelessly receive the sensor signal. For example, the transmitter 160 and the receiver 162 may implement radio-frequency identification (RFID) technology. In such an example, the transmitter 160 may be an RFID tag while the receiver 162 may be an RFID reader.

The sensor signal indicative of the parameter(s) of the track system 16$_i$ may be issued by the sensor 152 in any suitable manner.

In this embodiment, the sensor 152 is configured to issue the input signal indicative of the parameter(s) of the track system 16$_i$ to the processing apparatus 154 autonomously. For instance, the transmitter 160 of the sensor 152 may issue the input signal indicative of the parameter(s) of the track system 16$_i$ to the processing apparatus 154 repeatedly (e.g., periodically or at some other predetermined instants). This may allow a short response time for adjustment of the anti-rotation device 52

In other embodiments, the processing apparatus 154 may be configured to issue an interrogation signal directed to the sensor 152, which is configured to issue the sensor signal indicative of the speed of the track 41 to the processing apparatus 154 in response to the interrogation signal. In such embodiments, the processing apparatus 154 may comprise a transmitter 164 to transmit the interrogation signal to the sensor 152, which comprises a receiver 165 to receive the interrogation signal. In this case, the transmitter 164 of the processing apparatus 154 is a wireless transmitter to wirelessly transmit the interrogation signal and the receiver 165 of the sensor 152 is a wireless receiver to wirelessly receive the interrogation signal. In some examples of implementation, the transmitter 160 and the receiver 165 of the sensor 152 may be implemented by a transceiver and/or the transmitter 164 and the receiver 162 of the processing apparatus 154 may be implemented by a transceiver.

The processing apparatus 154 is configured to issue the adjustment command relating to the adjustment of the anti-rotation device 52 based on the sensor signal from the sensor 152 and possibly other input and/or information. More specifically, in this embodiment, the processing apparatus 154 issues the adjustment command in the form of a signal (e.g., an electrical signal) directed to the actuator 156 of the automatic adjustment system 150 to control the operation of the anti-rotation device 52 based on the sensed parameter(s) of the track system 16$_i$. In other embodiments, the adjustment command issued by the processing apparatus 154 may also be directed to an output device (e.g., a display) for outputting information regarding the operation of the anti-rotation device 52 to the user of the ATV 10.

In some embodiments, the processing apparatus 154 may process information from sources other than the sensor 152 to determine the adjustment command. For instance, in some embodiments, the processing apparatus 154 may process information from an engine control unit (ECU) of the ATV 10 to infer that an adjustment of the anti-rotation device 52 is desirable. In such embodiments, the adjustment command issued by the processing apparatus 154 is therefore unrelated to sensors monitoring parameters of the track system 16$_i$.

Figure 36:
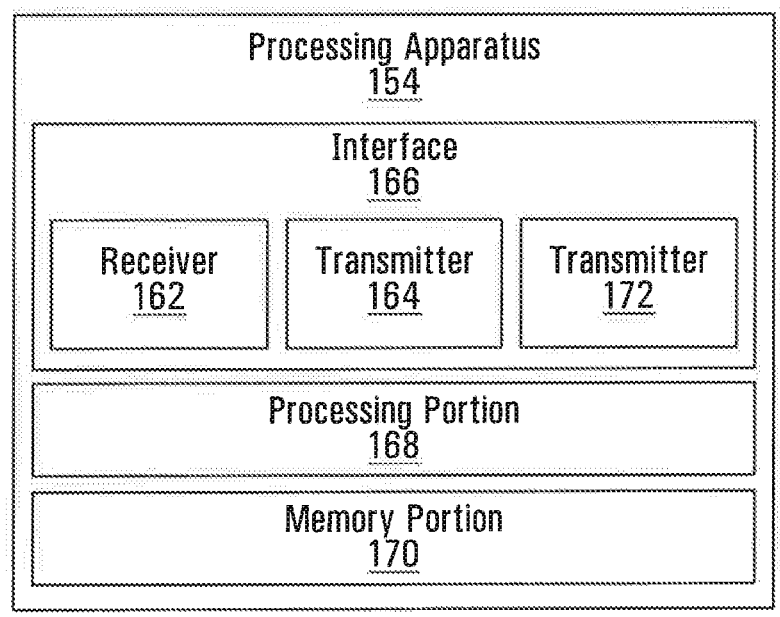
FIG. 36 shows an example of an embodiment of the processing apparatus of the controller.

In this embodiment, as shown in FIG. 36, the processing apparatus 154 comprises an interface 166, a processing portion 168, and a memory portion 170, which are implemented by suitable hardware and/or software.

The interface 166 comprises one or more inputs and outputs allowing the processing apparatus 154 to receive input signals from and send output signals to other components to which the processing apparatus 154 is connected (i.e., directly or indirectly connected). For example, in this embodiment, an input of the interface 166 is implemented by the wireless receiver 162 to receive the sensor signal from the sensor 152. An output of the interface 166 is implemented by a transmitter 172 to transmit the adjustment command to the actuator 156. In some embodiments, another output of the interface 166 is implemented by the wireless transmitter 164 to transmit the interrogation signal to the sensor 152.

The processing portion 168 comprises one or more processors for performing processing operations that implement functionality of the processing apparatus 154. A processor of the processing portion 168 may be a general-purpose processor executing program code stored in the memory portion 170. Alternatively, a processor of the processing portion 168 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 170 comprises one or more memories for storing program code executed by the processing portion 168 and/or data used during operation of the processing portion 168. A memory of the memory portion 170 may be a semiconductor medium (including, e.g., a solid-state memory), a magnetic storage medium, an optical storage medium, and/or any other suitable type of memory. A memory of the memory portion 170 may be read-only memory (ROM) and/or random-access memory (RAM), for example.

In some embodiments, the processing apparatus 154 may determine the adjustment command at least in part based on information contained in the memory portion 170. For instance, the memory portion 170 of the processing apparatus 154 may contain information associating different values of a parameter relating to the track system 16$_i$ and/or the ATV 10 with different values of a given parameter of the anti-rotation device 52. For example, the memory portion 170 of the processing apparatus 154 may associate ranges of the speed of motion of the track 41 with a given preload value of the spring 96. Thus, upon receiving the sensor signal indicative of the speed of motion of the track 41, the processing apparatus 154 may consult its memory portion 170 to associate the sensed speed of motion of the track 41 with a corresponding preload value of the spring 96. A similar approach may be undertaken for other sensed parameters of the track system 16$_i$ and/or the ATV 10 and/or other adjustable parameters of the anti-rotation device 52.

In some embodiments, two or more elements of the processing apparatus 154 may be implemented by devices that are physically distinct from one another and may be connected to one another via a bus (e.g., one or more electrical conductors or any other suitable bus) or via a communication link which may be wired, wireless, or both. In other embodiments, two or more elements of the processing apparatus 154 may be implemented by a single integrated device.

The processing apparatus 154 may be implemented in any other suitable way in other embodiments.

Figure 37:
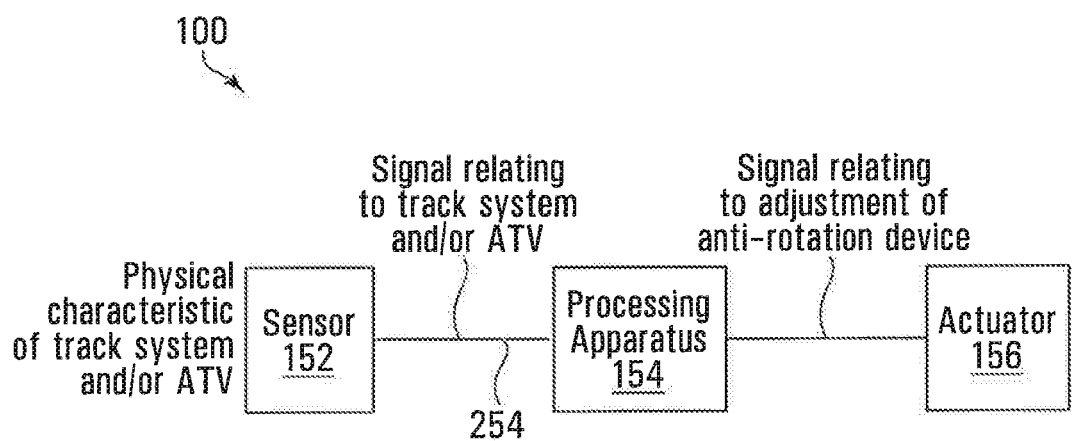
FIG. 37 shows a flow diagram depicting interactions between the sensor, the processing apparatus and the actuator of the control mechanism.

The adjustment command that is issued by the processing apparatus 154 may relate to the adjustment of different parameters of the anti-rotation device 52. For instance, in this embodiment, with additional reference to FIG. 37, the adjustment command is configured to cause the actuator 156 to adjust the preload of the spring 96 of the anti-rotation device 52. For instance, the adjustment command may cause the actuator 156 to increase and/or decrease the preload of the spring 96 based on one or more sensed parameters of the track system $16_i$. For example, in this particular embodiment, the actuator 156 is configured to adjust the preload of the spring 96 based at least in part on the speed of motion of the track 41. In some embodiments, the actuator 156 may alternatively or additionally adjust the preload of the spring based on the direction of motion of the track 41, on the compliance of the ground beneath the track system $16_i$, and/or any other suitable parameters relating to the track system $16_i$.

More specifically, in this embodiment, as will be described in more detail below, the actuator 156 is configured to displace the first end $97_1$ of the spring 96 relative to the second end $97_2$ of the spring 96 in the longitudinal direction of the anti-rotation device 52 to modify the preload of the spring 96.

The actuator 156 may be implemented in various ways. For instance, in this embodiment, the actuator 156 is an electromechanical actuator. In other embodiments, the actuator 156 may be any other suitable type of actuator such as a mechanical actuator or a fluidic actuator (e.g., a hydraulic or pneumatic actuator).

Figure 38:
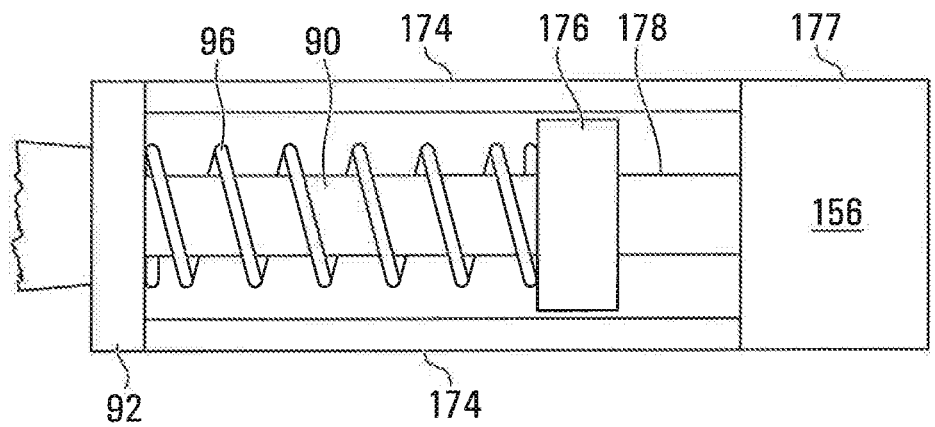
FIG. 38 shows an example of an embodiment of the actuator of the automatic adjustment system.

In this embodiment, as shown in FIG. 38, the actuator 156 is a linear actuator that is capable of inducing linear motion. The actuator 156 comprises a base 177 including a motor (not shown) that is responsive to the adjustment command transmitted by the processing apparatus 154. The actuator 156 further comprises a shaft 178 that is driven by the motor of the actuator 156. Such linear actuators are well known in the art and their operation will thus not be further described here. The base 177 of the actuator 156 is mounted to the mounting bracket 92 of the anti-rotation device 52 for support via a plurality of support members 174 that are affixed to the mounting bracket 92 (e.g., via fasteners). An end of the shaft 178 of is connected to a support bushing 176 of the anti-rotation device 52 which abuts the first end $97_1$ of the spring 96 and is mounted to the stabilizing rod 90.

The shaft 178 is operable to displace the support bushing 176 along the longitudinal direction of the anti-rotation device 52 away from or towards the mounting bracket 92 as determined by the adjustment command transmitted by the processing apparatus 154. Displacing the support bushing 172 towards the mounting bracket 92 increases the preload of the spring 96 while displacing the support bushing 172 away from the mounting bracket 92 reduces the preload of the spring 96.

Thus, in use, the sensor 152 senses a parameter relating to the track system $16_i$ and issues a signal indicative of the value of the parameter to the processing apparatus 154 which in turn processes the sensor signal to determine and issue the adjustment command to the actuator 156. In this embodiment, the adjustment command relates to the actuation of the shaft 178 to effect a displacement of the support bushing 176 which, as described above, modifies the preload of the spring 96.

In this embodiment, the actuator 156 offers a continuous range of adjustment of the preload of the spring 96. In other words, the support bushing 176 may occupy an infinite number of distinct positions within its range of displacement. As such, the preload of the spring 96 may have one of an infinite number of different values in accordance to the position of the support bushing 176.

In one example of implementation, an elevated speed of the track 41 sensed by the sensor 152 and transmitted to the processing apparatus 154 may cause the processing apparatus 154 to effect an increase of the preload of the spring 96 by signaling the actuator 156 to actuate its shaft 178 to displace the support bushing 176 towards the mounting bracket 92. This may help improve the stability of the track system $16_i$. In another example, a low speed of the track 41 sensed by the sensor 152 and transmitted to the processing apparatus 154 may cause the processing apparatus 154 to effect a reduction of the preload of the spring 96 by signaling the actuator 156 to actuate its drive shaft 178 to displace the support bushing 176 away from the mounting bracket 92. This may help the track system $16_i$ gain traction and/or avoid generating feedback at the steering device of the ATV 10 (i.e., vibrations at the steering device).

As discussed above, in some embodiments, the sensor 152 may be operable to sense other parameters relating to the track system $16_i$ or the ATV 10. In such embodiments, the adjustment command issued by the processing apparatus 154 may be based at least in part on the sensor signal indicative of the values of these other parameters. For example, the adjustment command to adjust the preload of the spring 96 of the anti-rotation device 52 may also be based at least in part on the speed of the ATV 10, on the direction of motion of the track 41 and/or the ATV 10, and/or on the profile or compliance of the ground beneath the track system $16_i$.

The adjustment command issued by the processing apparatus 154 may also relate to the adjustment of other parameters of the anti-rotation device 52.

For instance, in some embodiments, the adjustment command may be related to the adjustment of the length $L_A$ of the anti-rotation device 52 based on one or more sensed parameters relating to the track system $16_i$ and/or the ATV 10. For example, this may include a speed of the track 41, the angle of attack a of the track system $16_i$, the slope of the ground and/or the torque applied by the track 41 on the ground. To that end, in some embodiments, the adjustment command may cause the actuator 156 to displace the rod end 98 along the longitudinal direction of the anti-rotation device 52 thus increasing or decreasing the length $L_A$ of the anti-rotation device 52. For example, the actuator 156 may be operable to selectively increase and decrease the threaded engagement of the rod end 98 with the stabilizing rod 90.

In some embodiments, the adjustment command may be related to the adjustment of the stiffness $K_t$ of the spring 96 based on one or more sensed parameters relating to the track system $16_i$ and/or the ATV 10.

In some embodiments, the adjustment command may be related to the adjustment of the stiffness $K_d$ of the damper 88 based on one or more sensed parameters relating to the track system $16_i$ and/or the ATV 10.

In some embodiments, the adjustment command may be related to the adjustment of the preload of the damper 88 based on one or more sensed parameters relating to the track system $16_i$ and/or the ATV 10.

In some embodiments, the automatic adjustment system 150 may adjust the anti-rotation device 52 of each of the track systems $16_1$-$16_4$ differently. For instance, the processing apparatus 154 of the automatic adjustment system 150 may determine the adjustment command differently for a front one of the track systems $16_1$-$16_4$ (e.g., the track systems $16_1$, $16_2$) than for a rear one of the track systems $16_1$-$16_4$ (e.g., the track systems $16_3$, $16_4$). For example, the automatic adjustment system 150 of a rear one of the track systems $16_1$-$16_4$ (e.g., the track system $16_4$) may cause an increase of the preload of the spring 96 while the ATV 10 is moving in a forward direction and cause a decrease of the preload of the spring 96 while the ATV 10 is moving in a reverse direction.

In a variant, the controller 250 may be part of the ATV 10 rather than the track system $16_i$. For example, the controller 250 may be part of an ECU of the ATV 10 or may be part of any other controller of the ATV 10.

Figure 39:
FIG. 39 shows an example of an embodiment in which the controller is part of a communication device.

In another variant, as shown in FIG. 39, the controller 250 may be part of a communication device external to the ATV 10 (e.g., such as communication device 200 described above). For instance, in this variant, the controller 250 of the communication device 200 may sense the speed of the ATV 10 based on GPS data relayed to the communication device 200. The processing apparatus 154 of the controller 250 may consequently determine the adjustment command based on the sensed speed of the communication device 200 and transmit the adjustment command to the actuator 156 to adjust the anti-rotation device 52 accordingly. Moreover, in some cases, the controller 250 may sense the profile of the ground (i.e., terrain roughness, unevenness) based on data provided by an accelerometer of the communication device 200. The processing apparatus 154 may consequently determine the adjustment command based on the accelerometer data and transmit the adjustment command to the actuator 156 to adjust the anti-rotation device 52 accordingly.

Figure 40:
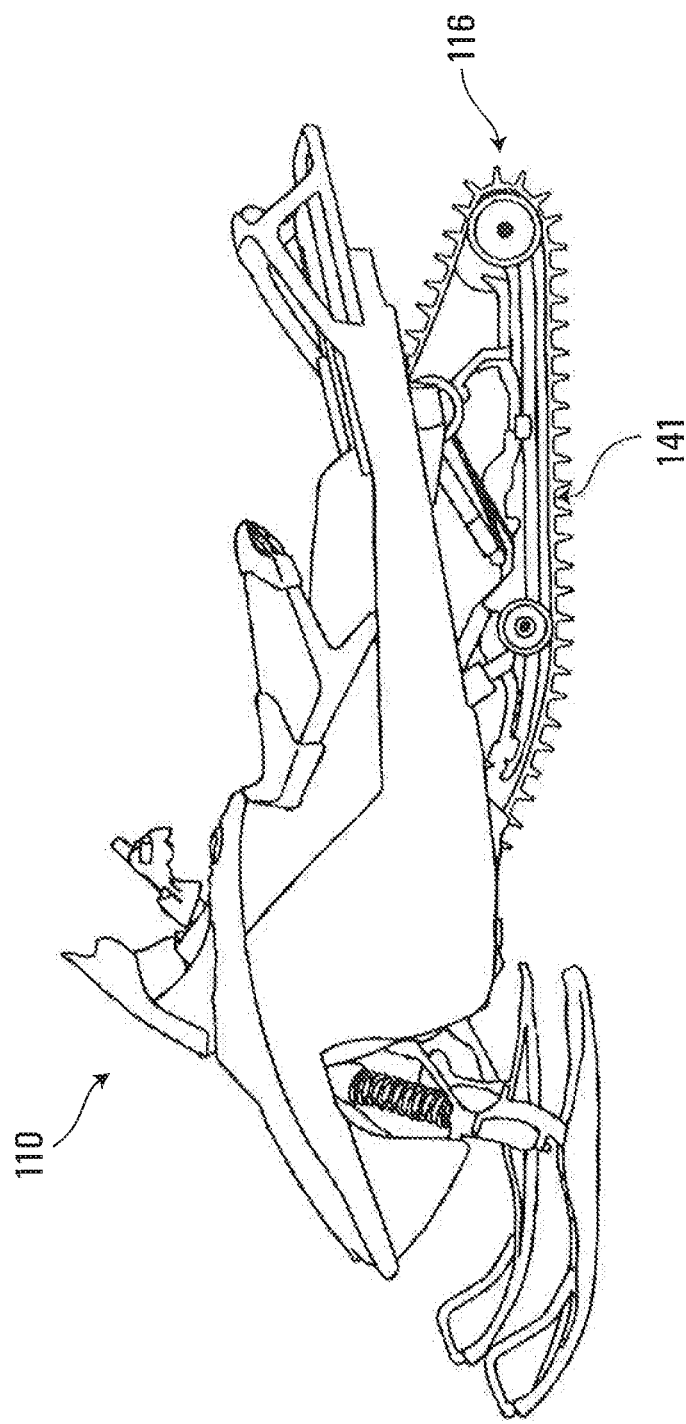
FIG. 40 shows an example of a snowmobile comprising a track system in accordance with another embodiment of the invention.
Figure 41:
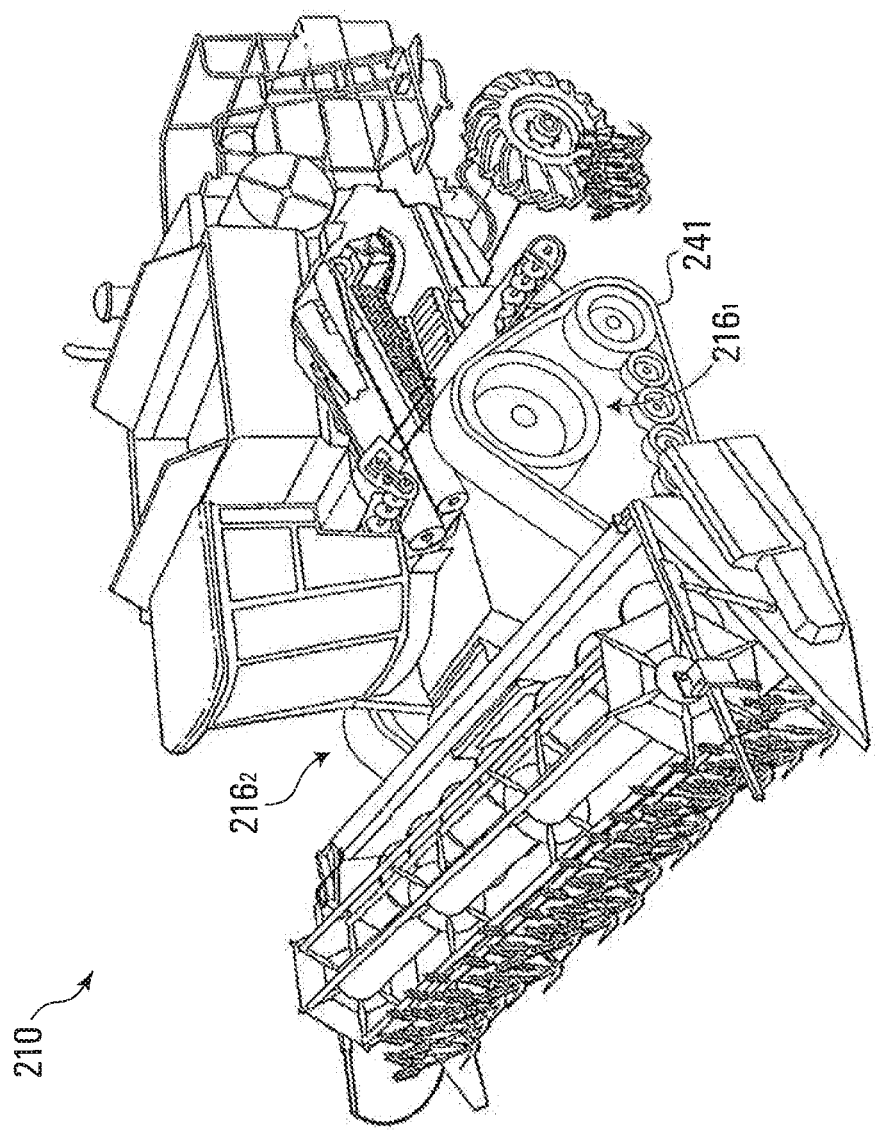
FIG. 41 shows an example of an agricultural vehicle comprising a track system in accordance with another embodiment of the invention.

While in this embodiment the track system $16_i$ is part of an ATV, in other embodiments, a track system constructed according to principles discussed herein may be used as part of other types of off-road vehicles. For example, in some embodiments, as shown in FIG. 40, a track system 116 including a track 141 constructed according to principles discussed herein may be used as part of a snowmobile 110. In other embodiments, as shown in FIG. 41, a track system 216, including a track 241 constructed according to principles discussed herein may be used as part of an agricultural vehicle 210 (e.g., a tractor, a harvester, etc.).

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track system for traction of a vehicle on a ground, the vehicle comprising a powertrain and a frame supporting the powertrain, the track system comprising:

a track comprising a ground-engaging outer side for engaging the ground and an inner side opposite to the ground-engaging outer side;
a track-engaging assembly for driving and guiding the track around the track-engaging assembly, the track-engaging assembly comprising:
a frame; and
a drive wheel for imparting motion to the track;
an anti-rotation device configured to restrict rotation of the frame of the track system relative to the frame of the vehicle, the anti-rotation device being connectable between the frame of the track system and the frame of the vehicle; and
a control mechanism configured to adjust the anti-rotation device in response to a command.

2. The track system of claim 1, wherein the control mechanism is configured to adjust a parameter of the anti-rotation device in response to the command in order to adjust the anti-rotation device.

3. The track system of claim 2, wherein the anti-rotation device comprises a spring and the parameter of the anti-rotation device is a parameter of the spring.

4. The track system of claim 3, wherein the parameter of the spring is a stiffness of the spring.

5. The track system of claim 3, wherein the parameter of the spring is a preload of the spring.

6. The track system of claim 2, wherein the parameter of the anti-rotation device is a length of the anti-rotation device.

7. The track system of claim 2, wherein the anti-rotation device comprises a damper and the parameter of the anti-rotation device is a parameter of the damper.

8. The track system of claim 7, wherein the parameter of the damper is a stiffness of the damper.

9. The track system of claim 7, wherein the parameter of the damper is a preload of the damper.

10. The track system of claim 2, wherein the parameter of the anti-rotation device is a first parameter of the anti-rotation device and the control mechanism is configured to adjust a second parameter of the anti-rotation device in response to the command in order to adjust the anti-rotation device.

11. The track system of claim 10, wherein the anti-rotation device comprises a spring and the first parameter of the anti-rotation device and the second parameter of the anti-rotation device are two of: a stiffness of the spring, a preload of the spring, and a length of the anti-rotation device.

12. The track system of claim 1, wherein the command is inputtable by a user via a user interface comprising an input device and configured to allow the user to adjust the anti-rotation device.

13. The track system of claim 12, wherein the user interface is configured to allow the user to adjust a parameter of the anti-rotation device.

14. The track system of claim 13, wherein the user interface is configured to allow the user to input an indication of a desired value of the parameter of the anti-rotation device.

15. The track system of claim 12, wherein the input device comprises a mechanical input element.

16. The track system of claim 15, wherein the mechanical input element comprises a lever, a switch, a button, a knob, a dial, or a manual screw.

17. The track system of claim 12, wherein the input device comprises a virtual input element.

18. The track system of claim 1, wherein the control mechanism comprises the user interface.

19. The track system of claim 1, where the vehicle comprises the user interface.

20. The track system of claim 1, wherein the command is automatically generated by a controller.

21. The track system of claim 20, wherein the control mechanism comprises the controller.

22. The track system of claim 20, wherein the vehicle comprises the controller.

23. The track system of claim 20, wherein the controller is configured to generate the command based on information regarding the track system.

24. The track system of claim 23, wherein the information regarding the track system includes information regarding a state of the track system.

25. The track system of claim 24, wherein the information regarding the state of the track system includes a speed of motion of the track around the track-engaging assembly.

26. The track system of claim 24, wherein the information regarding the state of the track system includes a tension of the track.

27. The track system of claim 23, wherein the information regarding the track system includes information regarding an environment of the track system.

28. The track system of claim 27, wherein the information regarding the environment of track system includes information regarding the ground beneath the track system.

29. The track system of claim 23, wherein the information regarding the track system includes information regarding a state of the vehicle to which the track system is mounted.

30. The track system of claim 29, wherein the information regarding the state of the vehicle to which the track system is mounted includes a speed of the vehicle.

31. The track system of claim 20, wherein the controller comprises a sensor configured to sense a parameter relating to the track system and the controller is configured to automatically generate the command based on the parameter relating to the track system.

32. The track system of claim 31, wherein the parameter relating to the track system is a speed of motion of the track around the track-engaging assembly.

33. The track system of claim 31, wherein the parameter relating to the track system includes a tension of the track.

34. The track system of claim 31, wherein the parameter relating to the track system is a speed of the vehicle to which the track system is mounted.

35. The track system of claim 20, wherein the controller comprises a processing apparatus configured to process information and to generate the command based on the information.

36. The track system of claim 35, wherein at least part of the information is derived from a sensor.

37. The track system of claim 1, wherein the control mechanism comprises an actuator connected to the anti-rotation device to adjust the anti-rotation device in response to the command.

38. The track system of claim 37, wherein the actuator is a mechanical actuator.

39. The track system of claim 37, wherein the actuator is an electromechanical actuator.

40. The track system of claim 1, wherein the command is conveyed as a mechanical action.

41. The track system of claim 1, wherein the command is conveyed as a signal.

42. The track system of claim 1, wherein the control mechanism is configured to adjust the anti-rotation device based on an angle of attack of the track system.

43. The track system of claim 1, wherein the control mechanism is configured to adjust the anti-rotation device based on a speed of the vehicle.

44. A track system for traction of a vehicle on a ground, the vehicle comprising a powertrain and a frame supporting the powertrain, the track system comprising:
- a track comprising a ground-engaging outer side for engaging the ground and an inner side opposite to the ground-engaging outer side;
- a track-engaging assembly for driving and guiding the track around the track-engaging assembly, the track-engaging assembly comprising:
  - a frame; and
  - a drive wheel for imparting motion to the track;
- an anti-rotation device configured to restrict rotation of the frame of the track system relative to the frame of the vehicle, the anti-rotation device being connectable between the frame of the track system and the frame of the vehicle; and
- a control mechanism configured to adjust the anti-rotation device automatically.

45. A track system for traction of a vehicle on a ground, the vehicle comprising a powertrain and a frame supporting the powertrain, the track system comprising:
- a track comprising a ground-engaging outer side for engaging the ground and an inner side opposite to the ground-engaging outer side;
- a track-engaging assembly for driving and guiding the track around the track-engaging assembly, the track-engaging assembly comprising:
  - a frame; and
  - a drive wheel for imparting motion to the track;
- an anti-rotation device configured to restrict rotation of the frame of the track system relative to the frame of the vehicle, the anti-rotation device being connectable between the frame of the track system and the frame of the vehicle; and
- a control mechanism configured to adjust the anti-rotation device based on an angle of attack of the track system.

46. The track system of claim 45, wherein the control mechanism is responsive to a command input by a user via a user interface comprising an input device to adjust the anti-rotation device.

47. The track system of claim 45, wherein the control mechanism is responsive to a command automatically generated by a controller to adjust the anti-rotation device.

48. A track system for traction of a vehicle on a ground, the vehicle comprising a powertrain and a frame supporting the powertrain, the track system comprising:
- a track comprising a ground-engaging outer side for engaging the ground and an inner side opposite to the ground-engaging outer side;
- a track-engaging assembly for driving and guiding the track around the track-engaging assembly, the track-engaging assembly comprising:
  - a frame; and
  - a drive wheel for imparting motion to the track;
- an anti-rotation device configured to restrict rotation of the frame of the track system relative to the frame of the vehicle, the anti-rotation device being connectable between the frame of the track system and the frame of the vehicle; and
- a control mechanism configured to adjust the anti-rotation device based on a speed of the vehicle.

* * * * *